United States Patent [19]

Hesson

[11] Patent Number: 5,121,352
[45] Date of Patent: Jun. 9, 1992

[54] MULTIPLIER-ACCUMULATOR CIRCUIT ARRAY OPERABLE IN MULTIPLE MODES

[75] Inventor: James H. Hesson, Boise, Id.

[73] Assignee: Micron Technology, Inc., Boise, Id.

[21] Appl. No.: 478,122

[22] Filed: Feb. 6, 1990

[51] Int. Cl.⁵ .............................................. G06F 7/52
[52] U.S. Cl. ..................................... 364/757; 364/758
[58] Field of Search ................ 364/757, 758, 759, 784

[56] References Cited

U.S. PATENT DOCUMENTS

| | | | |
|---|---|---|---|
| 3,866,030 | 2/1975 | Baugh et al. | 364/757 |
| 4,706,210 | 11/1987 | Snelling et al. | 364/758 |
| 4,831,577 | 5/1989 | Wei et al. | 364/757 |
| 4,839,848 | 6/1989 | Peterson et al. | 364/757 |
| 4,870,609 | 9/1989 | Yasui et al. | 364/784 |

*Primary Examiner*—David H. Malzahn
*Attorney, Agent, or Firm*—Angus C. Fox, III

[57] ABSTRACT

A high-speed circuit that performs unsigned mode, two's complement mode, and mixed mode multiplication-accumulation with equal facility. The invention incorporates a high degree of regularity and interconnectivity. Speed is accomplished through interconnectivity, use of high speed adder elements, and a multiple-row addition technique.

5 Claims, 36 Drawing Sheets

$$X = \sum_{i=0}^{m-1} a_i 2^i$$

FIG. 1a $$Y = \sum_{j=0}^{n-1} b_j 2^j$$

FIG. 1b $$Z = \sum_{i=0}^{m+n-1} c_i 2^i$$

FIG. 1c $$X_{tc} = -a_{m-1} 2^{m-1} + \sum_{i=0}^{m-2} a_i 2^i \quad \text{FIG. 2a}$$

$$Y_{tc} = -b_{n-1} 2^{n-1} + \sum_{j=0}^{n-2} b_j 2^j \quad \text{FIG. 2b}$$

$$Z_{tc} = -c_{m+n-1} 2^{m+n-1} + \sum_{i=0}^{m+n-2} c_i 2^i \quad \text{FIG. 2c}$$

$$X_{uns} = a_{m-1} 2^{m-1} + \sum_{i=0}^{m-2} a_i 2^i \quad \text{FIG. 2d}$$

$$Y_{uns} = b_{n-1} 2^{n-1} + \sum_{j=0}^{n-2} b_j 2^j \quad \text{FIG. 2e}$$

$$Z_{uns} = c_{m+n-1} 2^{m+n-1} + \sum_{i=0}^{m+n-2} c_i 2^i \quad \text{FIG. 2f}$$

$$P_{tc} = +a_{m-1}b_{n-1}2^{m+n-2} + \overbrace{\sum_{i=0}^{m-2}\sum_{j=0}^{n-2} a_i b_j 2^{i+j}}^{M} - \overbrace{\sum_{i=0}^{m-2} a_i b_{n-1} 2^{n-1+i}}^{N} - \overbrace{\sum_{j=0}^{n-2} a_{m-1} b_j 2^{m-1+j}}^{O}$$

FIG. 3a $$P_{uns} = +a_{m-1}b_{n-1}2^{m+n-2} + \sum_{i=0}^{m-2}\sum_{j=0}^{n-2} a_i b_j 2^{i+j} + \sum_{i=0}^{m-2} a_i b_{n-1} 2^{n-1+i} + \sum_{j=0}^{n-2} a_{m-1} b_j 2^{m-1+j}$$

FIG. 3b $$P_A = -a_{m-1}b_{n-1}2^{m+n-2} + \sum_{i=0}^{m-2}\sum_{j=0}^{n-2} a_i b_j 2^{i+j} + \sum_{i=0}^{m-2} a_i b_{n-1} 2^{n-1+i} - \sum_{j=0}^{n-2} a_{m-1} b_j 2^{m-1+j}$$

FIG. 3c $$P_B = -a_{m-1}b_{n-1}2^{m+n-2} + \sum_{i=0}^{m-2}\sum_{j=0}^{n-2} a_i b_j 2^{i+j} - \sum_{i=0}^{m-2} a_i b_{n-1} 2^{n-1+i} + \sum_{j=0}^{n-2} a_{m-1} b_j 2^{m-1+j}$$

FIG. 3d $$L = a_{m-1}b_{n-1}2^{m+n-2}$$

$$\underbrace{0 \cdot 2^{m+n} + 0 \cdot 2^{m+n-1} + a_{m-1}b_{n-1}2^{m+n-2} + 0 \cdot 2^{m+n-3} + \ldots + 0 \cdot 2^0}_{}\Bigg\} \text{FIG. 4a}$$

$$\underbrace{1 \cdot 2^{m+n} + 1 \cdot 2^{m+n-1} + \overline{a_{m-1}b_{n-1}}2^{m+n-2} + 1 \cdot 2^{m+n-3} + \ldots + 0 \cdot 2^0}_{}\Bigg\} \text{FIG. 4b}$$

$$\underbrace{1 \cdot 2^{m+n} + 1 \cdot 2^{m+n-1} + \overline{a_{m-1}b_{n-1}}2^{m+n-2} + 1 \cdot 2^{m+n-3} + \ldots + 1 \cdot 2^0}_{} + 1 \Bigg\} \text{FIG. 4c}$$

$$\begin{array}{c}+ a_{m-1}b_{n-1}2^{m+n-2}\\+ 1 \cdot 2^{m+n-2}\end{array} + 0 \cdot 2^{m+n-3} + \ldots + 0 \cdot 2^0 \Bigg\} \text{FIG. 4d}$$

$$\begin{bmatrix} 0 & 0 & 0 & \cdots & 0 \\ 1 & 1 & \overline{a_{m-1}b_{n-1}} & \cdots & 0 \end{bmatrix} \text{FIG. 4e}$$

FIG. 5a
$$N = \sum_{i=0}^{m-2} a_i b_{n-1} 2^{n-1+i}$$

FIG. 5b
$$0 \cdot 2^{m+n} + 0 \cdot 2^{m+n-1} + 0 \cdot 2^{m+n-2} + \sum_{i=0}^{m-2} a_i b_{n-1} 2^{n-1+i}$$

FIG. 5c
$$0 \cdot 2^{m+n} + 0 \cdot 2^{m+n-1} + 0 \cdot 2^{m+n-2} + \sum_{i=0}^{m-2} a_i 2^{n-1+i}$$

FIG. 5d
$$1 \cdot 2^{m+n} + 1 \cdot 2^{m+n-1} + 1 \cdot 2^{m+n-2} + 1 + \sum_{i=0}^{m-2} \overline{a_i} 2^{n-1+i}$$

FIG. 5e
$$1 \cdot 2^{m+n} + 1 \cdot 2^{m+n-1} + \overline{b_{n-1}} 2^{m+n-1} + b_{n-1} 2^{m+n-2} + b_{n-1} + \sum_{i=0}^{m-2} \overline{a_i} b_{n-1} 2^{n-1+i}$$

FIG. 5f
$$\begin{bmatrix} 0 & \overline{b_{n-1}} & b_{n-1} & \overline{a_{m-2} b_{n-1}} & \overline{a_{m-3} b_{n-1}} & \cdots & \overline{a_1 b_{n-1}} & \overline{a_0 b_{n-1}} \\ 1 & 1 & 0 & 0 & 0 & \cdots & 0 & b_{n-1} \end{bmatrix}$$

FIG. 6a $$O = \sum_{j=0}^{n-2} a_{m-1} b_j 2^{m-1+j}$$

FIG. 6b $$0 \cdot 2^{m+n} + 0 \cdot 2^{m+n-1} + 0 \cdot 2^{m+n-2} + \sum_{j=0}^{n-2} a_{m-1} b_j 2^{m-1+j}$$

FIG. 6c $$0 \cdot 2^{m+n} + 0 \cdot 2^{m+n-1} + 0 \cdot 2^{m+n-2} + \sum_{j=0}^{n-2} \overline{b_j} 2^{m-1+j}$$

FIG. 6d $$1 \cdot 2^{m+n} + 1 \cdot 2^{m+n-1} + 1 \cdot 2^{m+n-2} + 1 + \sum_{j=0}^{n-2} \overline{b_j} 2^{m-1+j}$$

FIG. 6e $$1 \cdot 2^{m+n} + 1 \cdot 2^{m+n-1} + \overline{a_{m-1}} 2^{m+n-1} + a_{m-1} 2^{m+n-2} + a_{m-1} 2^{m+n-2} + a_{m-1} + \sum_{j=0}^{n-2} a_{m-1} \overline{b_j} 2^{m-1+j}$$

FIG. 6f $$\begin{bmatrix} 0 & \overline{a_{m-1}} & a_{m-1} & a_{m-1}\overline{b_{n-2}} & a_{m-1}\overline{b_{n-3}} & \ldots & a_{m-1}\overline{b_1} & a_{m-1}\overline{b_0} \\ 1 & 1 & 0 & 0 & 0 & \ldots & 0 & a_{m-1} \end{bmatrix}$$

$$Z_{tc} = -c_{m+n-1}2^{m+n-1} + \sum_{i=0}^{m+n-2} c_i 2^i$$

FIG. 7a $$c_{m+n-1}2^{m+n-1} = 0 \cdot 2^{m+n} + c_{m+n-1}2^{m+n-1} + 0 \cdot 2^{m+n-2} + \ldots + 0 \cdot 2^0$$

FIG. 7b $$-c_{m+n-1}2^{m+n-1} = 1 \cdot 2^{m+n} + \overline{c_{m+n-1}}2^{m+n-1} + 1 \cdot 2^{m+n-2} + \ldots + 1 \cdot 2^0 + 1$$

FIG. 7c $$-c_{m+n-1}2^{m+n-1} = 1 \cdot 2^{m+n} + \overline{c_{m+n-1}}2^{m+n-1} + 1 \cdot 2^{m+n-2} + \ldots + 0 \cdot 2^0$$

FIG. 7d $$\begin{bmatrix} 0 \\ 1 \end{bmatrix} \quad \begin{matrix} 0 \\ 0 \\ \vdots \\ \overline{c_{m+n-1}} \\ 1 \end{matrix} \quad \begin{matrix} 0 \\ 0 \\ \vdots \\ 0 \\ 0 \end{bmatrix}$$

| | $a_7$ $b_7$ | $a_6$ $b_6$ | $a_5$ $b_5$ | $a_3$ $b_3$ | $a_2$ $b_2$ | $a_1$ $b_1$ | $a_0$ $b_0$ | |
|---|---|---|---|---|---|---|---|---|
| | | | | | | | $a_0b_0$ | $c_0$ |
| | | | | | | $a_1b_0$ | $a_0b_1$ | $c_1$ |
| | | | | | $a_2b_0$ | $a_1b_1$ | $a_0b_2$ | $c_2$ |
| | | | | $a_3b_0$ | $a_2b_1$ | $a_1b_2$ | $a_0b_3$ | $c_3$ |
| | | | $a_4b_0$ | $a_3b_1$ | $a_2b_2$ | $a_1b_3$ | $a_0b_4$ | $c_4$ |
| | | $a_5b_0$ | $a_4b_1$ | $a_3b_2$ | $a_2b_3$ | $a_1b_4$ | $a_0b_5$ | $c_5$ |
| | $a_6b_0$ | $a_5b_1$ | $a_4b_2$ | $a_3b_3$ | $a_2b_4$ | $a_1b_5$ | $a_0b_6$ | $c_6$ |
| $a_7b_0$ | $a_6b_1$ | $a_5b_2$ | $a_4b_3$ | $a_3b_4$ | $a_2b_5$ | $a_1b_6$ | $a_0b_7$ | $c_7$ |
| $a_7b_1$ | $a_6b_2$ | $a_5b_3$ | $a_4b_4$ | $a_3b_5$ | $a_2b_6$ | $a_1b_7$ | | $c_8$ |
| $a_7b_2$ | $a_6b_3$ | $a_5b_4$ | $a_4b_5$ | $a_3b_6$ | $a_2b_7$ | | | $c_9$ |
| $a_7b_3$ | $a_6b_4$ | $a_5b_5$ | $a_4b_6$ | $a_3b_7$ | | | | $c_{10}$ |
| $a_7b_4$ | $a_6b_5$ | $a_5b_6$ | $a_4b_7$ | | | | | $c_{11}$ |
| $a_7b_5$ | $a_6b_6$ | $a_5b_7$ | | | | | | $c_{12}$ |
| $a_7b_6$ | $a_6b_7$ | | | | | | | $c_{13}$ |
| $a_7b_7$ | | | | | | | | $c_{14}$ |
| | | | | | | | | $c_{15}$ |

FIG. 8c

| | $c_7$ | $c_6$ | $c_5$ | $c_4$ | $c_3$ | $c_2$ | $c_1$ | $c_0$ |
|---|---|---|---|---|---|---|---|---|
| | $a_7b_0$ | $a_6b_0$ | $a_5b_0$ | $a_4b_0$ | $a_3b_0$ | $a_2b_0$ | $a_1b_0$ | $a_0b_0$ |
| | $a_6b_1$ | $a_5b_1$ | $a_4b_1$ | $a_3b_1$ | $a_2b_1$ | $a_1b_1$ | $a_0b_1$ | |
| | $c_8$ | | | | | | | |
| | $a_7b_1$ | | $a_5b_2$ | $a_4b_2$ | $a_3b_2$ | $a_2b_2$ | $a_1b_2$ | $a_0b_2$ |
| | $a_6b_2$ | | | | | | | |
| | $c_9$ | | | | | | | |
| | $a_7b_2$ | | $a_5b_3$ | $a_4b_3$ | $a_3b_3$ | $a_2b_3$ | $a_1b_3$ | $a_0b_3$ |
| | $a_6b_3$ | | | | | | | |
| | $c_{10}$ | | | | | | | |
| | $a_7b_3$ | | $a_5b_4$ | $a_4b_4$ | $a_3b_4$ | $a_2b_4$ | $a_1b_4$ | $a_0b_4$ |
| | $a_6b_4$ | | | | | | | |
| | $c_{11}$ | | | | | | | |
| | $a_7b_4$ | | $a_5b_5$ | $a_4b_5$ | $a_3b_5$ | $a_2b_5$ | $a_1b_5$ | $a_0b_5$ |
| | $a_6b_5$ | | | | | | | |
| | $c_{12}$ | | | | | | | |
| | $a_7b_5$ | | $a_5b_6$ | $a_4b_6$ | $a_3b_6$ | $a_2b_6$ | $a_1b_6$ | $a_0b_6$ |
| | $a_6b_6$ | | | | | | | |
| | $c_{13}$ | | | | | | | |
| $c_{15}$ | $a_7b_7$ | $a_7b_6$ | $a_5b_7$ | $a_4b_7$ | $a_3b_7$ | $a_2b_7$ | $a_1b_7$ | $a_0b_7$ |
| | | $a_6b_7$ | | | | | | |
| $c_{14}$ | | | | | | | | |

FIG. 9b $A = \bar{a}$  $B = \bar{b}$  $C = \bar{c}$

|  |  |  |  | $a_7$ | $a_6$ | $a_5$ | $a_3$ | $a_2$ | $a_1$ | $a_0$ |
|---|---|---|---|---|---|---|---|---|---|---|
|  |  |  |  | $b_7$ | $b_6$ | $b_5$ | $b_3$ | $b_2$ | $b_1$ | $b_0$ |
|  |  |  |  |  | $a_6b_0$ | $a_5b_0$ | $a_4b_0$ | $a_3b_0$ | $a_2b_0$ | $a_1b_0$ | $a_0b_0$ |
|  |  |  |  |  |  | $a_5b_1$ | $a_4b_1$ | $a_3b_1$ | $a_2b_1$ | $a_1b_0$ | $a_0b_1$ |
|  |  |  |  |  |  | $a_4b_2$ | $a_3b_2$ | $a_2b_2$ | $a_1b_1$ | $a_0b_2$ |
|  |  |  |  |  |  | $a_3b_3$ | $a_2b_3$ | $a_1b_2$ | $a_0b_3$ |
|  |  |  |  |  |  | $a_2b_4$ | $a_1b_3$ | $a_0b_4$ |
|  |  |  |  |  |  | $a_1b_5$ | $a_0b_5$ |
|  |  |  |  |  | $a_7B_0$ | $a_6b_1$ | $a_5b_2$ | $a_4b_3$ | $a_3b_4$ | $a_2b_5$ | $a_1b_6$ | $A_0b_7$ |
|  |  |  |  |  |  |  |  |  |  |  | $b_7$ |
|  |  |  |  |  |  |  |  |  |  |  | $a_7$ |
|  |  |  | $a_7B_1$ | $a_6b_2$ | $a_5b_3$ | $a_4b_4$ | $a_3b_5$ | $a_2b_6$ | $A_1b_7$ |
|  |  |  | $a_7B_2$ | $a_6b_3$ | $a_5b_4$ | $a_4b_5$ | $a_3b_6$ | $A_2b_7$ |
|  |  |  | $a_7B_3$ | $a_6b_4$ | $a_5b_5$ | $a_4b_6$ | $A_3b_7$ |
|  |  |  | $a_7B_4$ | $a_6b_5$ | $a_5b_6$ | $A_4b_7$ |
|  |  | $a_7B_5$ | $a_6b_6$ | $A_5b_7$ |
|  | $a_7B_6$ | $A_6b_7$ |
| 1 | $a_7b_7$ |
| $B_7$ | $b_7$ |
| $A_7$ | $a_7$ |

| $c_{15}$ | $c_{14}$ | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ |

FIG. 9c $\quad A=\bar{a} \quad B=\bar{b} \quad C=\bar{c}$

| | $c_7$ $a_7B_0$ $a_6b_1$ | $c_6$ $a_6b_0$ $a_5b_1$ | $c_5$ $a_5b_0$ $a_4b_1$ | $c_4$ $a_4b_0$ $a_3b_1$ | $c_3$ $a_3b_0$ $a_2b_1$ | $c_2$ $a_2b_0$ $a_1b_1$ | $c_1$ $a_1b_0$ $a_0b_1$ | $c_0$ $a_0b_0$ |
|---|---|---|---|---|---|---|---|---|
| | $c_8$ $a_7B_1$ $a_6b_2$ | $a_5b_2$ $a_7$ | $a_4b_2$ | $a_3b_2$ | $a_2b_2$ | $a_1b_2$ | $a_0b_2$ | |
| | $c_9$ $a_7B_2$ $a_6b_3$ | $a_5b_3$ | $a_4b_3$ | $a_3b_3$ | $a_2b_3$ | $a_1b_3$ | $a_0b_3$ | |
| | $c_{10}$ $a_7B_3$ $a_6b_4$ | $a_5b_4$ | $a_4b_4$ | $a_3b_4$ | $a_2b_4$ | $a_1b_4$ | $a_0b_4$ | |
| | $c_{11}$ $a_7B_4$ $a_6b_5$ | $a_5b_5$ | $a_4b_5$ | $a_3b_5$ | $a_2b_5$ | $a_1b_5$ | $a_0b_5$ | |
| | $c_{12}$ $a_7B_5$ $a_6b_6$ | $a_5b_6$ | $a_4b_6$ | $a_3b_6$ | $a_2b_6$ | $a_1b_6$ | $a_0b_6$ | |
| $C_{15}$ $A_7$ $B_7$ 1 | $a_7b_7$ $a_7$ $b_7$ $c_{14}$ | $c_{13}$ $a_7B_6$ $A_6b_7$ | $A_5b_7$ | $A_4b_7$ | $A_3b_7$ | $A_2b_7$ | $A_1b_7$ | $A_0b_7$ $b_7$ |

FIG. 10a

FIG. 10b $A = \bar{a}\ B = \bar{b}\ C = \bar{c}$

| | $a_7$ | $a_6$ | $a_5$ | $a_3$ | $a_3$ | $a_2$ | $a_1$ | $a_0$ | |
| --- | --- | --- | --- | --- | --- | --- | --- | --- | --- |
| | $b_7$ | $b_6$ | $b_5$ | $b_3$ | $b_3$ | $b_2$ | $b_1$ | $b_0$ | |
| | | $a_6b_0$ | $a_5b_0$ | $a_4b_0$ | $a_3b_0$ | $a_2b_0$ | $a_1b_0$ | $a_0b_0$ | |
| | | $a_5b_1$ | $a_4b_1$ | $a_3b_1$ | $a_2b_1$ | $a_1b_1$ | $a_0b_1$ | | |
| | | $a_4b_2$ | $a_3b_2$ | $a_2b_2$ | $a_1b_2$ | $a_0b_2$ | | | |
| | | $a_3b_3$ | $a_2b_3$ | $a_1b_3$ | $a_0b_3$ | | | | |
| | | $a_2b_4$ | $a_1b_4$ | $a_0b_4$ | | | | | |
| | | $a_1b_5$ | $a_0b_5$ | | | | | | |
| | $a_7B_0$ | $a_0b_6$ | | | | | | | |
| | $a_6b_1$ | | | | | | | | |
| | $a_5b_2$ | | | | | | | | |
| | $a_4b_3$ | | | | | | | | |
| | $a_3b_4$ | | | | | | | | |
| | $a_2b_5$ | | | | | | | | |
| | $a_1b_6$ | | | | | | | | |
| | $a_0b_7$ | | | | | | | | |
| $a_7$ | | | | | | | | | |

Due to the diagonal structure of this partial-product multiplication array, the content is presented as-is by diagonal rows:

Row (shift 0): $a_0b_0$ → $c_0$
Row (shift 1): $a_1b_0, a_0b_1$ → $c_1$
Row (shift 2): $a_2b_0, a_1b_1, a_0b_2$ → $c_2$
Row (shift 3): $a_3b_0, a_2b_1, a_1b_2, a_0b_3$ → $c_3$
Row (shift 4): $a_4b_0, a_3b_1, a_2b_2, a_1b_3, a_0b_4$ → $c_4$
Row (shift 5): $a_5b_0, a_4b_1, a_3b_2, a_2b_3, a_1b_4, a_0b_5$ → $c_5$
Row (shift 6): $a_6b_0, a_5b_1, a_4b_2, a_3b_3, a_2b_4, a_1b_5, a_0b_6$ → $c_6$
Row (shift 7): $a_7B_0, a_6b_1, a_5b_2, a_4b_3, a_3b_4, a_2b_5, a_1b_6, a_0b_7$ → $c_7$
Row (shift 8): $a_7B_1, a_6b_2, a_5b_3, a_4b_4, a_3b_5, a_2b_6, a_1b_7$ → $c_8$
Row (shift 9): $a_7B_2, a_6b_3, a_5b_4, a_4b_5, a_3b_6, a_2b_7$ → $c_9$
Row (shift 10): $a_7B_3, a_6b_4, a_5b_5, a_4b_6, a_3b_7$ → $c_{10}$
Row (shift 11): $a_7B_4, a_6b_5, a_5b_6, a_4b_7$ → $c_{11}$
Row (shift 12): $a_7B_5, a_6b_6, a_5b_7$ → $c_{12}$
Row (shift 13): $a_7B_6, a_6b_7$ → $c_{13}$
Row (shift 14): $1, A_7B_7$, $a_7$ → $c_{14}$
Row (shift 15): $1, A_7$ → $c_{15}$

FIG. 10c $A = \bar{a} \quad B = \bar{b} \quad C = \bar{c}$

| $c_7$ | $c_6$ | $c_5$ | $c_4$ | $c_3$ | $c_2$ | $c_1$ | $c_0$ |
|---|---|---|---|---|---|---|---|
| $a_7B_0$ | $a_6b_0$ | $a_5b_0$ | $a_4b_0$ | $a_3b_0$ | $a_2b_0$ | $a_1b_0$ | $a_0b_0$ |
| $a_6b_1$ | $a_5b_1$ | $a_4b_1$ | $a_3b_1$ | $a_2b_1$ | $a_1b_1$ | $a_0b_1$ | |
| $c_8$ | | | | | | | |
| $a_7B_1$ | $a_5b_2$ | $a_4b_2$ | $a_3b_2$ | $a_2b_2$ | $a_1b_2$ | $a_0b_2$ | |
| $a_6b_2$ | $a_7$ | | | | | | |
| $c_9$ | | | | | | | |
| $a_7B_2$ | $a_5b_3$ | $a_4b_3$ | $a_3b_3$ | $a_2b_3$ | $a_1b_3$ | $a_0b_3$ | |
| $a_6b_3$ | | | | | | | |
| $c_{10}$ | | | | | | | |
| $a_7B_3$ | $a_5b_4$ | $a_4b_4$ | $a_3b_4$ | $a_2b_4$ | $a_1b_4$ | $a_0b_4$ | |
| $a_6b_4$ | | | | | | | |
| $c_{11}$ | | | | | | | |
| $a_7B_4$ | $a_5b_5$ | $a_4b_5$ | $a_3b_5$ | $a_2b_5$ | $a_1b_5$ | $a_0b_5$ | |
| $a_6b_5$ | | | | | | | |
| $c_{12}$ | | | | | | | |
| $a_7B_5$ | $a_5b_6$ | $a_4b_6$ | $a_3b_6$ | $a_2b_6$ | $a_1b_6$ | $a_0b_6$ | |
| $a_6b_6$ | | | | | | | |
| $c_{13}$ | | | | | | | |
| $a_7B_6$ | $a_5b_7$ | $a_4b_7$ | $a_3b_7$ | $a_2b_7$ | $a_1b_7$ | $a_0b_7$ | |
| $a_6b_7$ | | | | | | | |

| $C_{15}$ | $A_7B_7$ |
|---|---|
| $A_7$ | $a_7$ |
| 1 | $c_{14}$ |
| | 1 |

FIG. 11b $A = \bar{a}$  $B = \bar{b}$  $C = \bar{c}$

| | $a_7$ $b_7$ | $a_6$ $b_6$ | $a_5$ $b_5$ | $a_4$ $b_4$ | $a_3$ $b_3$ | $a_2$ $b_2$ | $a_1$ $b_1$ | $a_0$ $b_0$ | |
|---|---|---|---|---|---|---|---|---|---|
| | | $a_6b_0$ | $a_5b_0$ | $a_4b_0$ | $a_3b_0$ | $a_2b_0$ | $a_1b_0$ | $a_0b_0$ | $c_0$ |
| | | $a_5b_1$ | $a_4b_1$ | $a_3b_1$ | $a_2b_1$ | $a_1b_1$ | $a_0b_1$ | | $c_1$ |
| | | $a_4b_2$ | $a_3b_2$ | $a_2b_2$ | $a_1b_2$ | $a_0b_2$ | | | $c_2$ |
| | | $a_3b_3$ | $a_2b_3$ | $a_1b_3$ | $a_0b_3$ | | | | $c_3$ |
| | | $a_2b_4$ | $a_1b_4$ | $a_0b_4$ | | | | | $c_4$ |
| | | $a_1b_5$ | $a_0b_5$ | | | | | | $c_5$ |
| | | $a_0b_6$ | | | | | | | $c_6$ |
| $a_7b_0$ | $a_6b_1$ | $a_5b_2$ | $a_4b_3$ | $a_3b_4$ | $a_2b_5$ | $a_1b_6$ | $A_0b_7$ | | | $c_7$ |
| $a_7b_1$ | $a_6b_2$ | $a_5b_3$ | $a_4b_4$ | $a_3b_5$ | $a_2b_6$ | $A_1b_7$ | | | | $c_8$ |
| $a_7b_2$ | $a_6b_3$ | $a_5b_4$ | $a_4b_5$ | $a_3b_6$ | $A_2b_7$ | | | | | $c_9$ |
| $a_7b_3$ | $a_6b_4$ | $a_5b_5$ | $a_4b_6$ | $A_3b_7$ | | | | | | $c_{10}$ |
| $a_7b_4$ | $a_6b_5$ | $a_5b_6$ | $A_4b_7$ | | | | | | | $c_{11}$ |
| $a_7b_5$ | $a_6b_6$ | $A_5b_7$ | | | | | | | | $c_{12}$ |
| $a_7b_6$ | $A_6b_7$ | | | | | | | | | $c_{13}$ |
| $A_7B_7$ | 1 | | | | | | | | | $c_{14}$ |
| $B_7$ | 1 | | | | | | | | | $C_{15}$ |

FIG. 11c $A = \bar{a} \quad B = \bar{b} \quad C = \bar{c}$

| $c_7$ | $c_6$ | $c_5$ | $c_4$ | $c_3$ | $c_2$ | $c_1$ | $c_0$ |
|---|---|---|---|---|---|---|---|
| $a_7b_0$ | $a_6b_0$ | $a_5b_0$ | $a_4b_0$ | $a_3b_0$ | $a_2b_0$ | $a_1b_0$ | $a_0b_0$ |
| $a_6b_1$ | $a_5b_1$ | $a_4b_1$ | $a_3b_1$ | $a_2b_1$ | $a_1b_1$ | $a_0b_1$ | |
| $c_8$ | | | | | | | |
| $a_7b_1$ | $a_5b_2$ | $a_4b_2$ | $a_3b_2$ | $a_2b_2$ | $a_1b_2$ | $a_0b_2$ | |
| $a_6b_2$ | | | | | | | |
| $c_9$ | | | | | | | |
| $a_7b_2$ | $a_5b_3$ | $a_4b_3$ | $a_3b_3$ | $a_2b_3$ | $a_1b_3$ | $a_0b_3$ | |
| $a_6b_3$ | | | | | | | |
| $c_{10}$ | | | | | | | |
| $a_7b_3$ | $a_5b_4$ | $a_4b_4$ | $a_3b_4$ | $a_2b_4$ | $a_1b_4$ | $a_0b_4$ | |
| $a_6b_4$ | | | | | | | |
| $c_{11}$ | | | | | | | |
| $a_7b_4$ | $a_5b_5$ | $a_4b_5$ | $a_3b_5$ | $a_2b_5$ | $a_1b_5$ | $a_0b_5$ | |
| $a_6b_5$ | | | | | | | |
| $c_{12}$ | | | | | | | |
| $a_7b_5$ | $a_5b_6$ | $a_4b_6$ | $a_3b_6$ | $a_2b_6$ | $a_1b_6$ | $a_0b_6$ | |
| $a_6b_6$ | | | | | | | |
| $c_{13}$ | | | | | | | |
| $a_7b_6$ | $A_5b_7$ | $A_4b_7$ | $A_3b_7$ | $A_2b_7$ | $A_1b_7$ | $A_0b_7$ | |
| $A_6b_7$ | | | | | | | $b_7$ |

| $C_{15}$ | $A_7B_7$ |
|---|---|
| $B_7$ | $b_7$ |
| 1 | $c_{14}$ |
| | 1 |

MULTIPLIER-ACCUMULATOR CIRCUIT ARRAY OPERABLE IN MULTIPLE MODES

BACKGROUND OF THE INVENTION

1. FIELD OF THE INVENTION

This invention generally relates to high-volume high-speed digital parallel processing, in particular a multiplier-accumulator integrated circuit array that will accept input operands in two's complement, unsigned magnitude, and mixed modes.

2. DESCRIPTION OF THE RELATED ART

A multiplier-accumulator is a computational device that multiplies two multiplier input terms and sums the product with an accumulator term, providing a final output term. A parallel multiplier has the characteristic of operating on multiple bits within the terms simultaneously, that is, in parallel. High speed parallel multipliers and multiplier-accumulators and their efficient integration into silicon or some other semiconductor substrate have been of interest since the early days of digital computers.

Many arithmetic circuits which are widely used in the digital arts are designed for use with two's complement binary signals. While such signals and the associated circuits are particularly well adapted for performing efficiently under many circumstances, two's complement multiplication often requires the use of specialized circuits for correcting errors or characteristically incomplete results. Attempts have been made to reduce specialized circuitry in two's complement arithmetic circuits. See, for example, U.S. Pat. No. 3,866,030 by inventors Baugh and Wooley for a two's complement parallel array multiplier.

A multiplier-accumulator that can operate equally well across unsigned mode, two's complement mode, and mixed modes is desirable.

It is therefore an object of the present invention to provide a multiplier-accumulator that accepts operand formats in all three of the aforementioned modes.

Although a multiplier-accumulator has speed advantages when compared to equivalent circuits, more speed is always desirable.

The present invention therefore has the object of high speed operation.

It has been recognized for some time that a regular circuit structure is advantageous when implementing it in silicon, as circuit regularity permits a faster layout time (either by hand or by a layout generator). Local interconnection between elements of an integrated circuit, which works well when the circuit is regular, minimizes parasitic capacitance and resistance to provide faster circuit operation.

It is therefore a further object of the present invention to provide multiple-mode multiplier-accumulator which has a high degree of circuit regularity and exploits local interconnection.

SUMMARY OF THE INVENTION

The invention is a circuit that can perform multiple-mode multiplication-accumulation. The circuit operates with equal facility on unsigned mode, two's complement mode, or mixed mode inputs.

By deriving special compensation expressions for terms having negative weight for each multiplication mode (two's complement, unsigned magnitude, and mixed modes), and by grouping these compensations in a particular manner, it is possible to eliminate the need for the generation of negative partial products. Further making these compensations conformal across the three multiplication modes, specialized circuitry is minimized and circuit regularity is maximized. Similar adder elements are arrayed, with all specialized circuitry being implemented as circuit modifications on some of these elements, thus improving circuit regularity and interconnectivity.

Fast adder elements are included to improve overall speed of the invention. Speed is further increased with the use of multiple-row addition techniques.

BRIEF DESCRIPTION OF THE DRAWINGS

FIGS. 1a–1c depict multiplier input operands X and Y and accumulator input Z in binary form. For example, in FIG. 1a, m=8 for an 8-bit word, and each a is a bit in that word.

FIGS. 2a–2c show expressions that yield magnitudes of two's complement terms $X_{tc}$, $Y_{tc}$, and $Z_{tc}$.

FIGS. 2d–2f show expressions that yield magnitudes of unsigned magnitude terms $X_{uns}$, $Y_{uns}$, and $Z_{uns}$.

FIGS. 3a–3d are expressions for the products $P_{tc}=X_{tc}\cdot Y_{tc}$, $P_{uns}=X_{uns}\cdot Y_{uns}$, $P_A=X_{tc}\cdot Y_{uns}$, and $P_B=X_{uns}\cdot Y_{tc}$, respectively.

FIGS. 4a–4e, 5a–5f, 6a–6f, and 7a–7e illustrate two-row compensation derivations for L, N, O, and Z, respectively.

FIGS. 8a–8c, 9a–9c, 10a–10c, and 11a–11c illustrate multiplication-accumulation in unsigned mode, two's complement mode, and mixed modes A and B. "a" figures show a standard representation. "b" figures show the representation condensed and slightly rearranged. "c", figures show an array configuration that will perform the multiplication-accumulation.

DETAILED DESCRIPTION OF THE PREFERRED EMBODIMENT

Figure 8A:
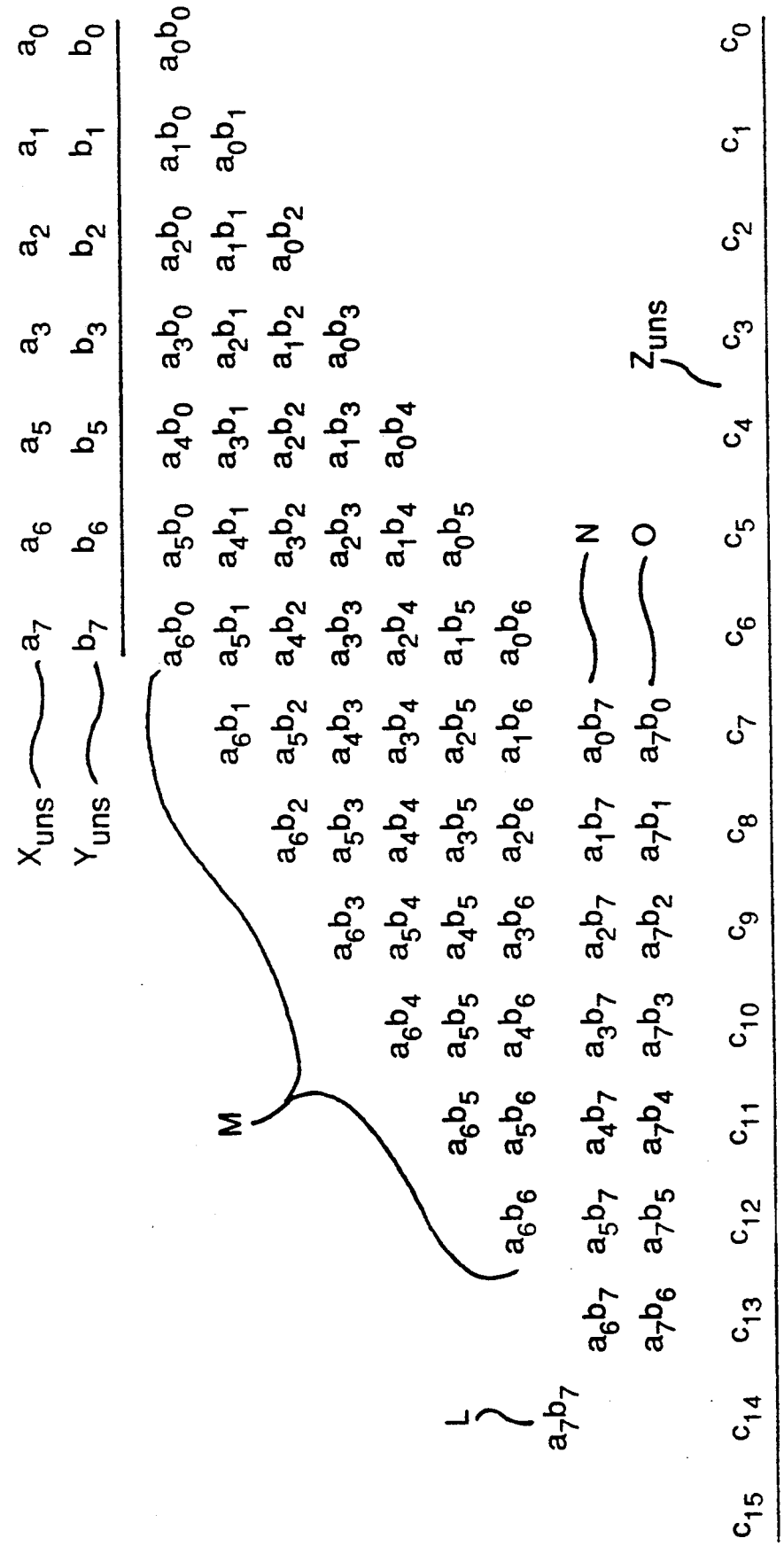

The design of the preferred embodiment of the invention follows certain algorithms, so this description will begin with their derivations. When the algorithms are understood, the design and use of the preferred embodiment are easier to comprehend.

1. Derivations

The inventive multiplier-accumulator has two multiplier input operands X and Y (also called product terms) and one accumulator term Z, expressed in FIGS. 1a–1c as binary power expansions. The two possible accumulator input modes are two's complement and unsigned magnitude. In this disclosure, subscript "tc" indicates two's complement mode, and subscript "uns" indicates unsigned magnitude mode. For example, $X_{tc}$ indicates X interpreted as a two's complement number. Further, in this disclosure, a term may be represented as a vector. For example, X (shown as a binary power expansion in FIG. 1) may also be represented as the vector ($a_{m-1}$, $a_{m-2}, \ldots, a_0$), Y as ($b_{n-1}, b_{n-2}, \ldots, b_0$), and Z as ($c_{m+n-1}, c_{m+n-2}, \ldots, c_0$). Multiplication is indicated by the symbol "·" and addition is indicated by the symbol "+". Logic operations are indicated in capitals, such as in the expression "a AND b", for example.

FIG. 2a is a two's complement expression of X: when X is to be interpreted as $X_{tc}$, the expression in FIG. 2a will yield the magnitude of $X_{tc}$. FIGS. 2b–2c show corresponding expressions for $Y_{tc}$ and $Z_{tc}$. FIGS. 2d–2f show similar expressions for $X_{uns}$, $Y_{uns}$, and $Z_{uns}$.

Since each of the input operands X and Y can be in two's complement mode or unsigned magnitude mode, there are four possible multiplication modes for the operation P=X·Y. These are two's complement mode ($P_{tc}=X_{tc}\cdot Y_{tc}$), unsigned magnitude mode ($P_{uns}=X_{uns}\cdot Y_{uns}$), mixed mode A ($P_A=X_{tc}\cdot Y_{uns}$), and mixed mode B ($P_B=X_{uns}\cdot Y_{tc}$) FIGS. 3a–3d, respectively, show expressions for each of these multiplication modes, based on FIGS. 2a–2f.

Note in FIGS. 3a–3d that each product includes different sign combinations of expressions L, M, N, and O. That is, $P_{tc}=+L+M-N-O$, $P_{uns}=+L+M+N+O$, $P_A=-L+M+N-O$, and $P_B=-L+M-N+O$. This is a significant observation and has bearing on the design of the preferred embodiment.

It is well known that binary addition of a two's complement form word is equivalent to its unsigned binary subtraction. Addition is more straightforward and more readily implemented than subtraction. To obtain a two's complement form, a word is inverted and a 1 is added to it. In the above-listed multiplication modes, terms L, N, and O are subtracted. In the preferred embodiment, "two-row compensations" are derived to aid in these subtractions. The two-row compensation $L_{2RC}$, for example, is a pair of rows of bits that when summed with an operand, gives a final accumulation that is as if L was subtracted. The two-row compensation contains two's complement arithmetic in a form that allows efficient design of the inventive multiplier-accumulator.

FIG. 4a shows the expression for term L, written the same as in FIG. 3a, for example. L may also be expressed as a summation of the two rows in FIG. 4b. FIG. 4c shows L inverted and a 1 added to obtain a two's complement inversion, rewritten in FIG. 4d. FIG. 4e shows L in a two's complement binary matrix form. FIG. 4e is the two-row compensation $L_{2RC}$.

Two-row compensation $N_{2RC}$ is generated as shown in FIGS. 5a–5f. FIG. 5a expresses term N, the same as in FIG. 3b, for example. N may also be expressed as shown in FIG. 5b. Note that $b_{n-1}$ is a binary constant, a 1 or 0. If $b_{n-1}=1$, then N reduces to FIG. 5c. If $b_{n-1}=0$, then N and its two's complement are both zero. For $b_{n-1}=1$, the two's complement of N is shown in FIG. 5d. Using this information, a generalized expression for the two's complement of N can be created, shown in FIG. 5e. The expression of FIG. 5e is then converted to $N_{2RC}$, shown in FIG. 5f.

Term O (FIG. 6a) is similar to N. The derivation of $O_{2RC}$, shown in FIG. 6f, is therefore derived using a similar technique.

Since the invention accumulates as well as multiplies, two-row compensation $Z_{2RC}$ for accumulator term Z must also be derived, since Z may be positive or negative in any multiplication-accumulation mode involving two's complement. This is shown in FIGS. 7a–7e. Note that when $c_{m+n-1}=1$, $Z<0$, and when $c_{m+n-1}=0$, $Z>0$.

With reference to FIGS. 8–11, the four multiply-accumulate modes are now detailed for 8-bit X and Y terms (m=8, n=8). In each figure, a somewhat standard representation of the operation is shown, and then an equivalent, preferred arrangement. Since M remains the same across all cases four modes are readily embodied in a single circuit.

FIG. 8a illustrates an unsigned mode multiplication-accumulation, that is, $X_{uns}\cdot Y_{uns}+Z_{uns}$. Elements of L, M, N and O are shown in their proper columns for addition. FIG. 8b shows the same algorithm, but with 0 moved over the upper left edge of M. FIG. 8c shows this operation in an array configuration. The correct result is obtained if addition is diagonally performed.

Figure 9A:
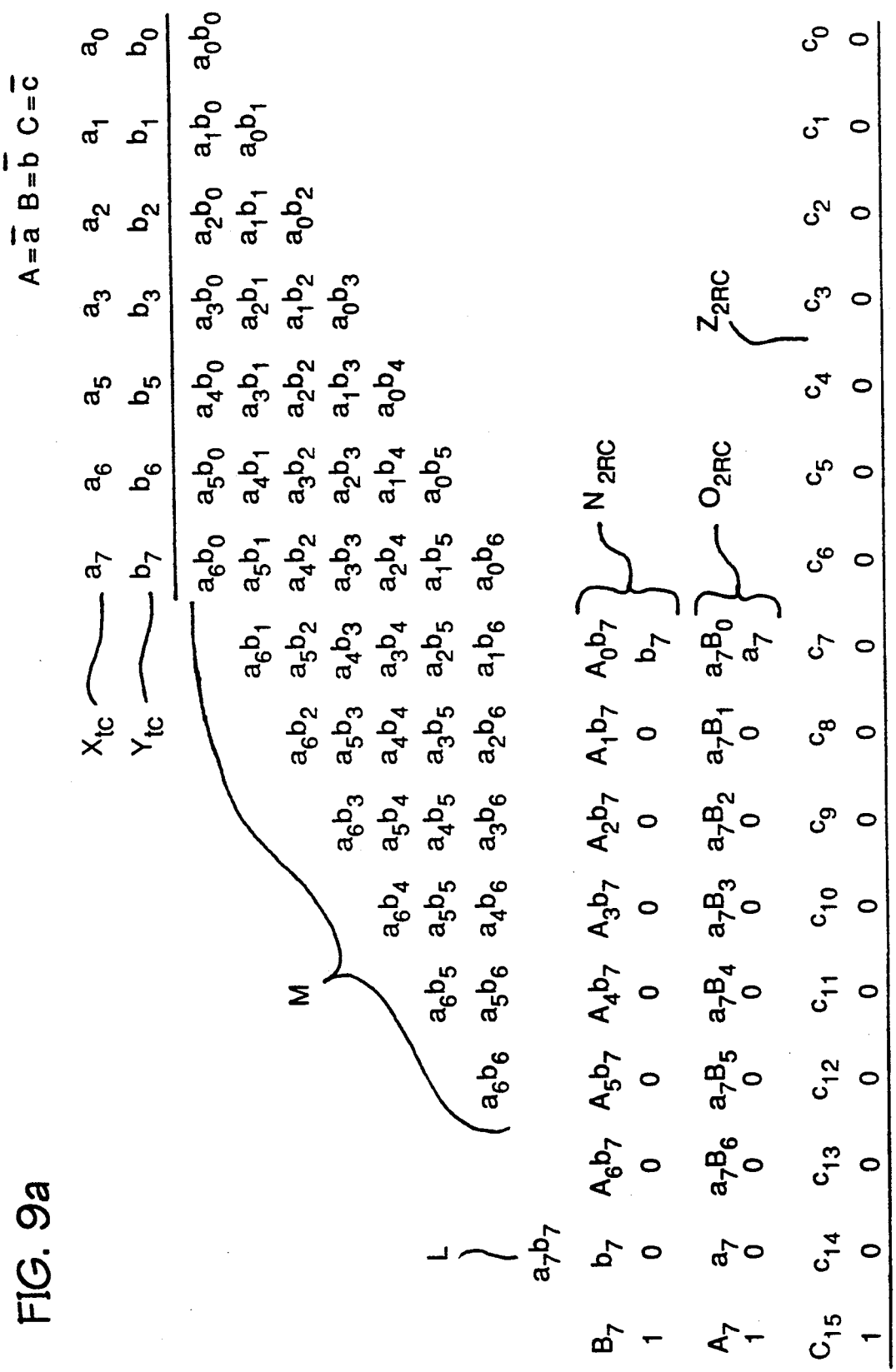

FIG. 9a illustrates a two's complement mode multiplication-accumulation, that is, $X_{tc}\cdot Y_{tc}+Z_{tc}$. Recall from FIG. 3a that N and O are subtracted in this mode. Instead of subtracting N and O in the preferred embodiment, two-row compensations $N_{2RC}$ and $O_{2RC}$ are summed. Because Z may be positive or negative in this mode, $Z_{2RC}$ is also summed. FIG. 9b shows the same derivation, but with all ones in the two-row compensations pre-summed and all but two elements of $O_{2RC}$ moved over the upper left edge of M. For the specific case of a multiply-only algorithm (no accumulation), the inventive method reduces to the familiar Baugh-Wooley two's complement multiplier method. FIG. 9c shows the operation in an array configuration. The correct result is obtained if addition is performed diagonally.

Figure 10A:
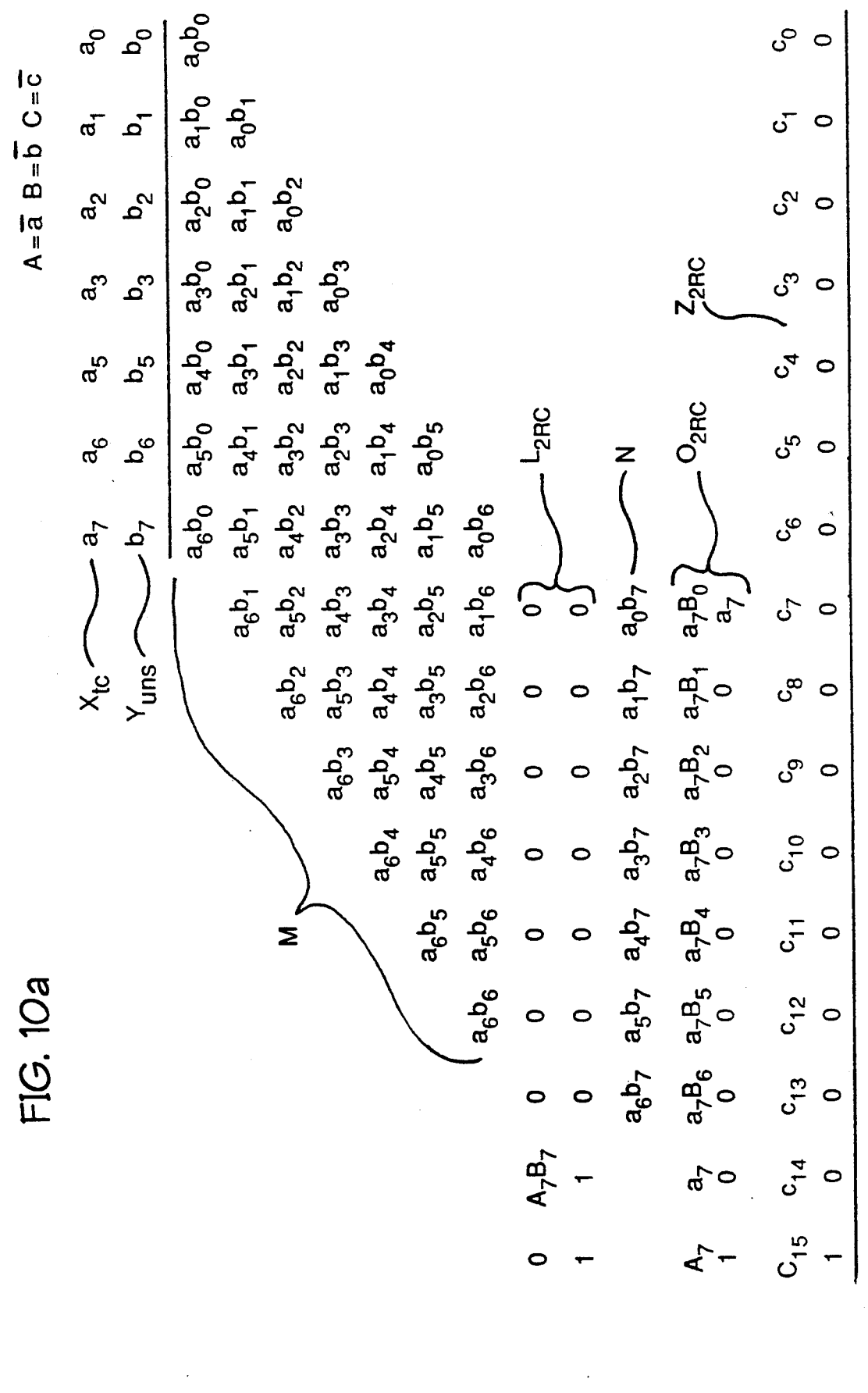

Mixed mode A ($X_{tc}\cdot Y_{uns}+Z_{tc}$) is illustrated in FIG. 10a. As shown in FIG. 3c, L and O are subtracted in this mode. Therefore $L_{2RC}$ and $O_{2RC}$ are added. $Z_{2RC}$ is also added because Z may be positive or negative in this mode. FIG. 10b shows the corresponding preferred arrangement. As in two's complement mode in FIG. 9b, all ones in the two-row compensations are pre-summed. As above, FIG. 10c shows an array configuration.

Figure 11A:
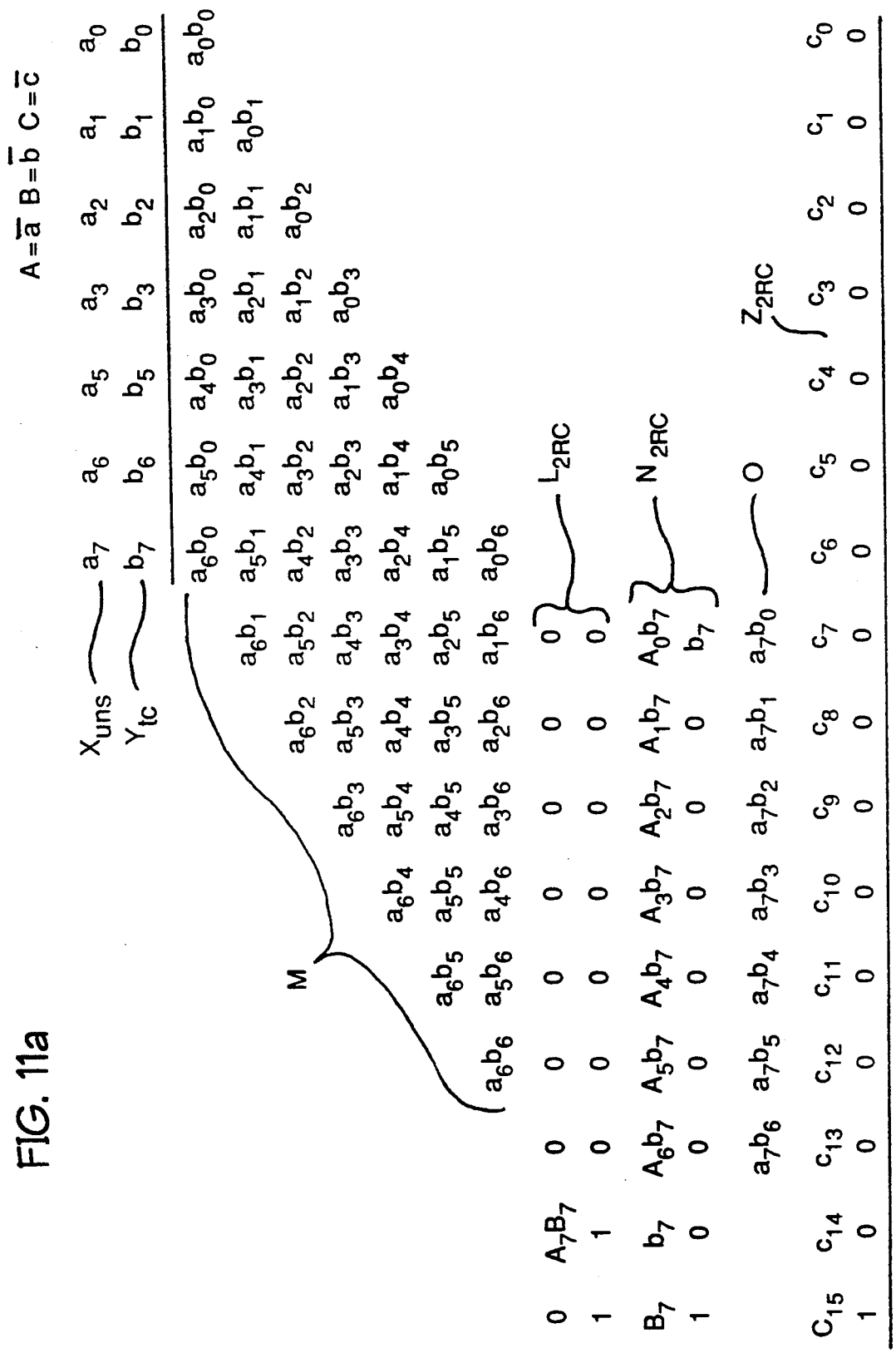

Finally, FIG. 11a illustrates mixed mode B ($X_{uns}\cdot Y_{tc}+Z_{tc}$). As shown in FIG. 3d, L and N are subtracted in this mode. Therefore $L_{2RC}$ and $N_{2RC}$ are added. $Z_{2RC}$ is also added because Z may be positive or negative in this mode. FIG. 11c shows a corresponding array configuration.

2. Embodiment

Figure 12A:
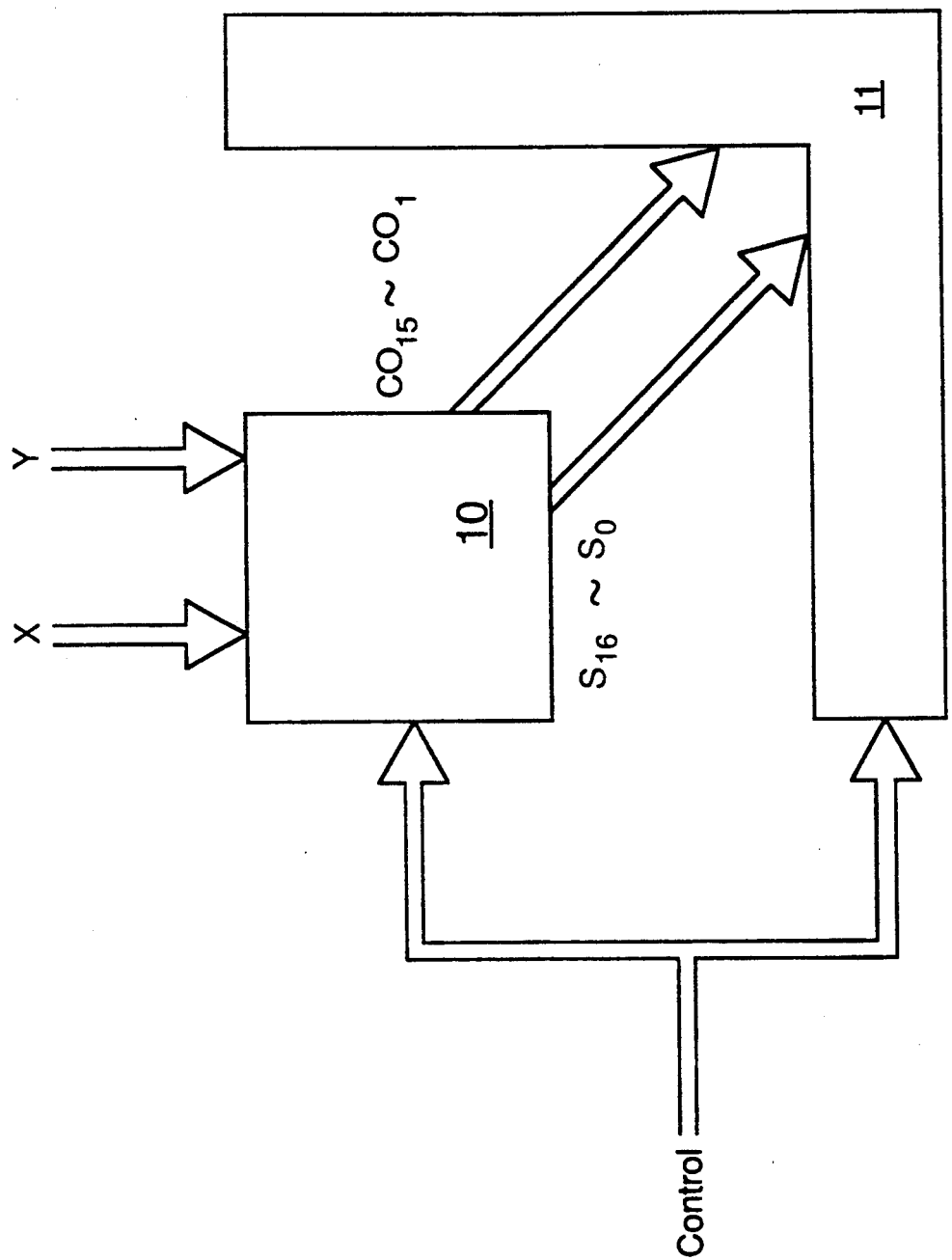
FIG. 12a is block diagram of the preferred multiplier-accumulator.
Figure 12B:
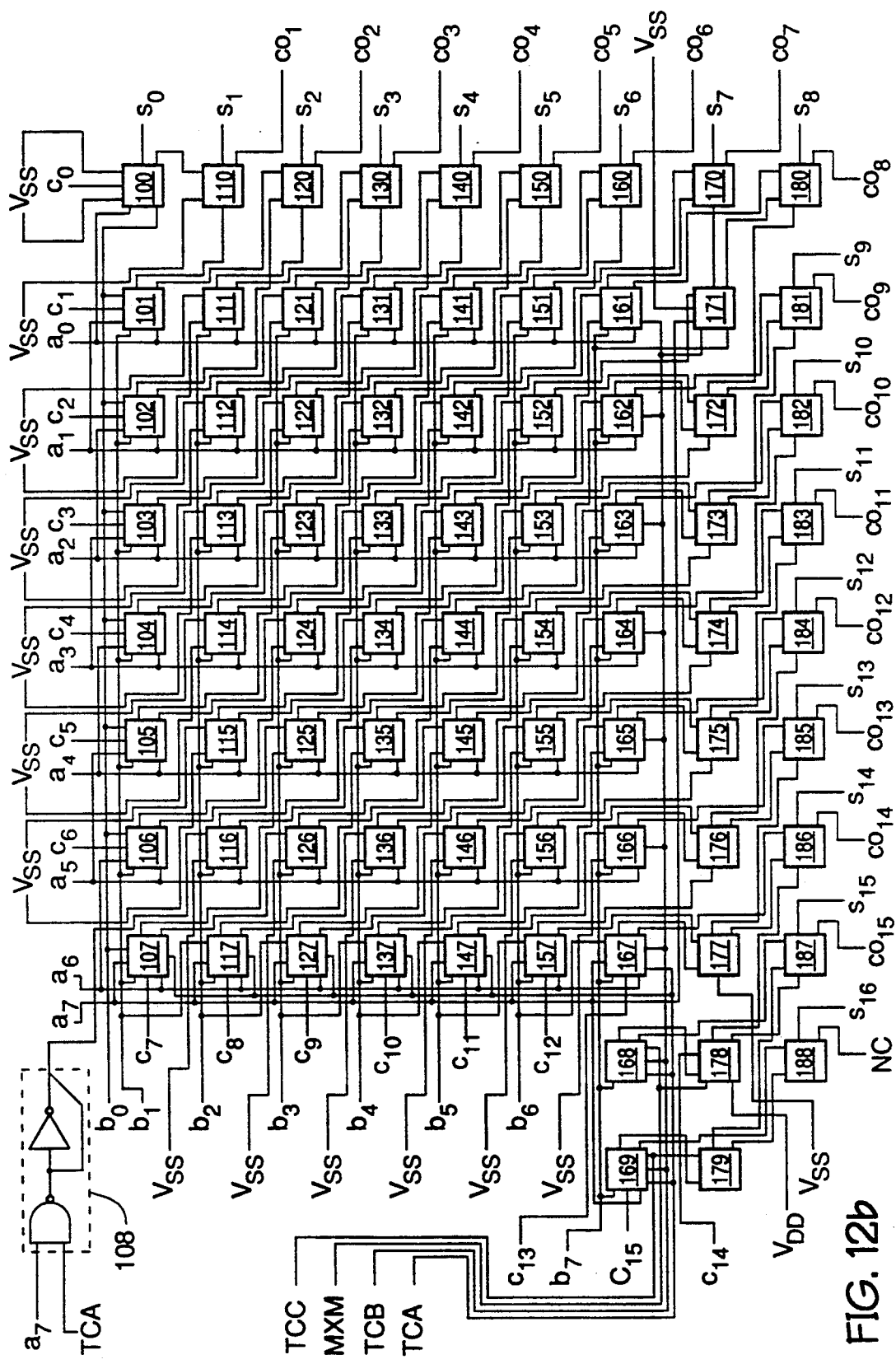
FIG. 12b is a schematic of the array portion.
Figure 13A:
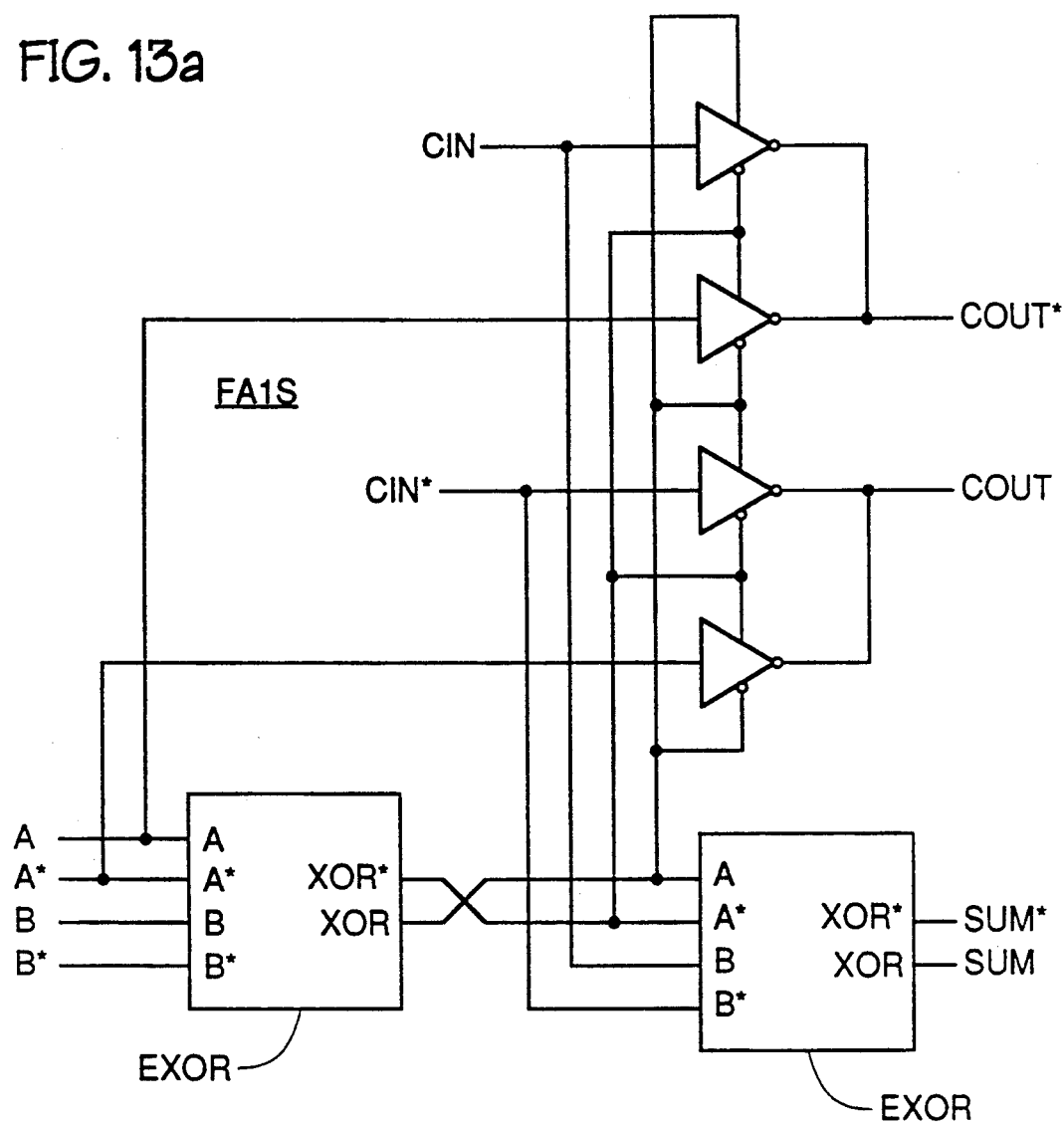
FIGS. 13a–13b, 14a–14b, 15a–15b, 16a–16b, 17a–17b, 18a–18b, 19a–19b, 20a–20b, 21a–21b and 22a–22b detail preferred adder elements and their operation. "a" figures are schematics of the elements. "b" figures are logical symbols, which are used in FIG. 12, for example.
Figure 13B:
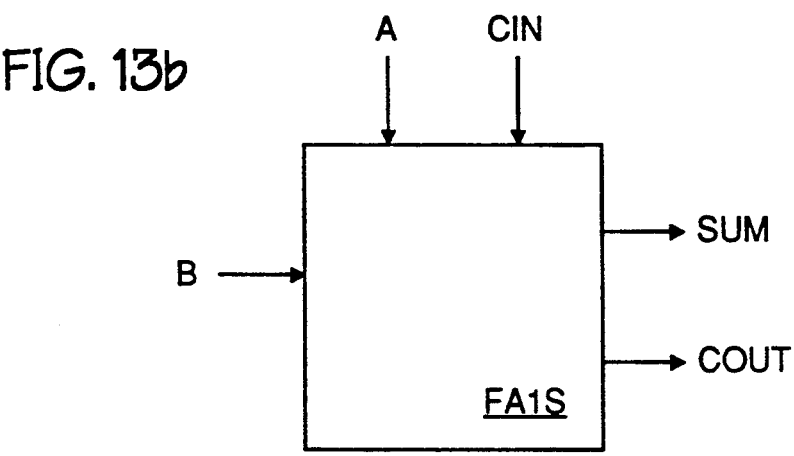
Figure 14A:
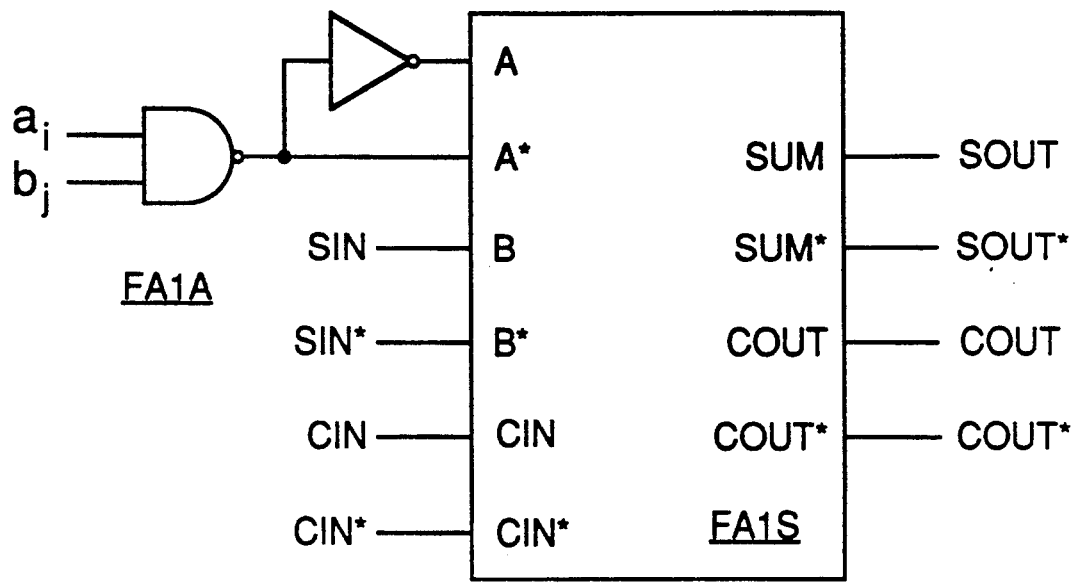
Figure 14B:
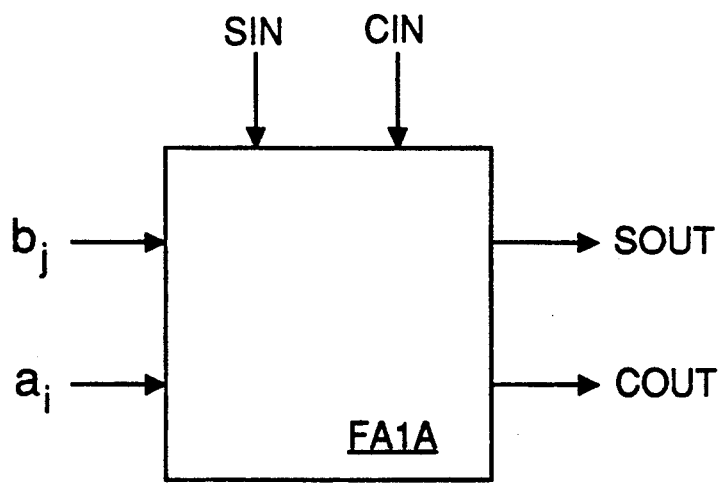
Figure 15A:
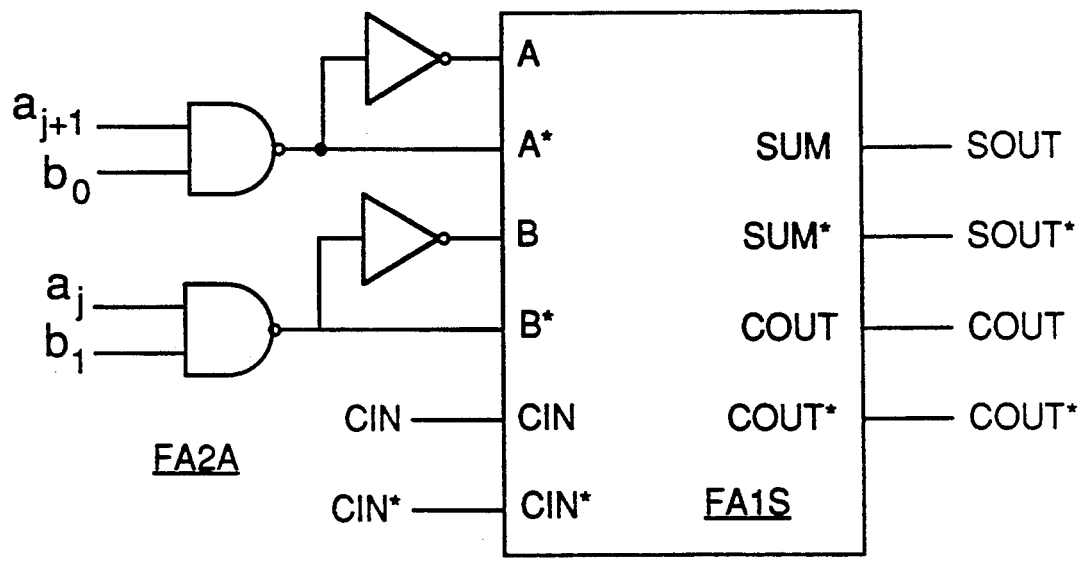
Figure 15B:
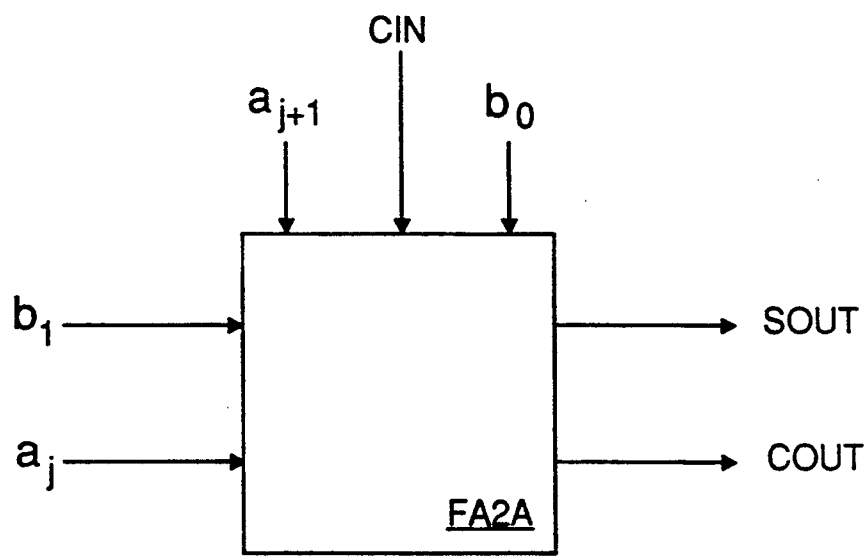
Figures 16A, 16B:
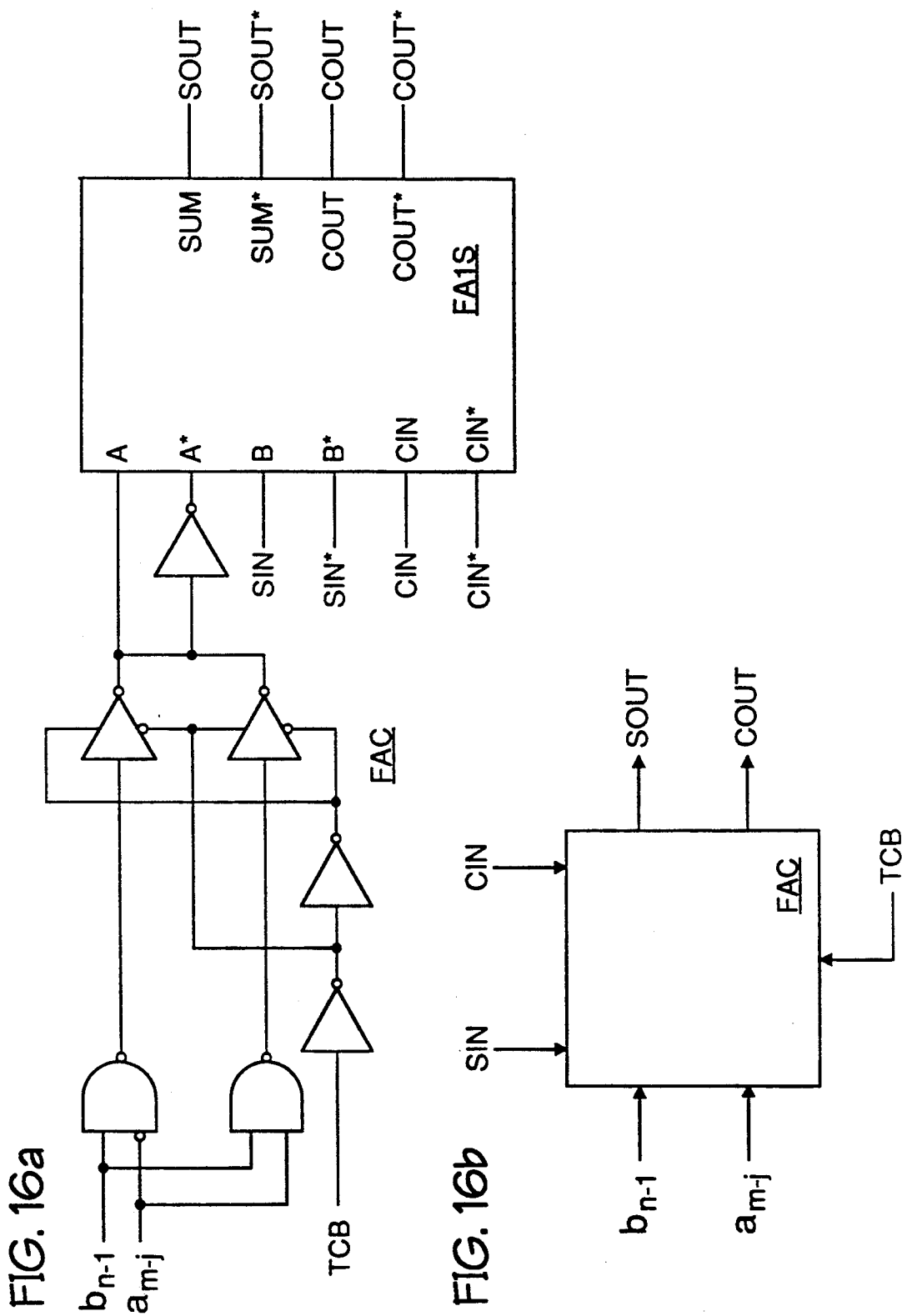
Figures 17A, 17B:
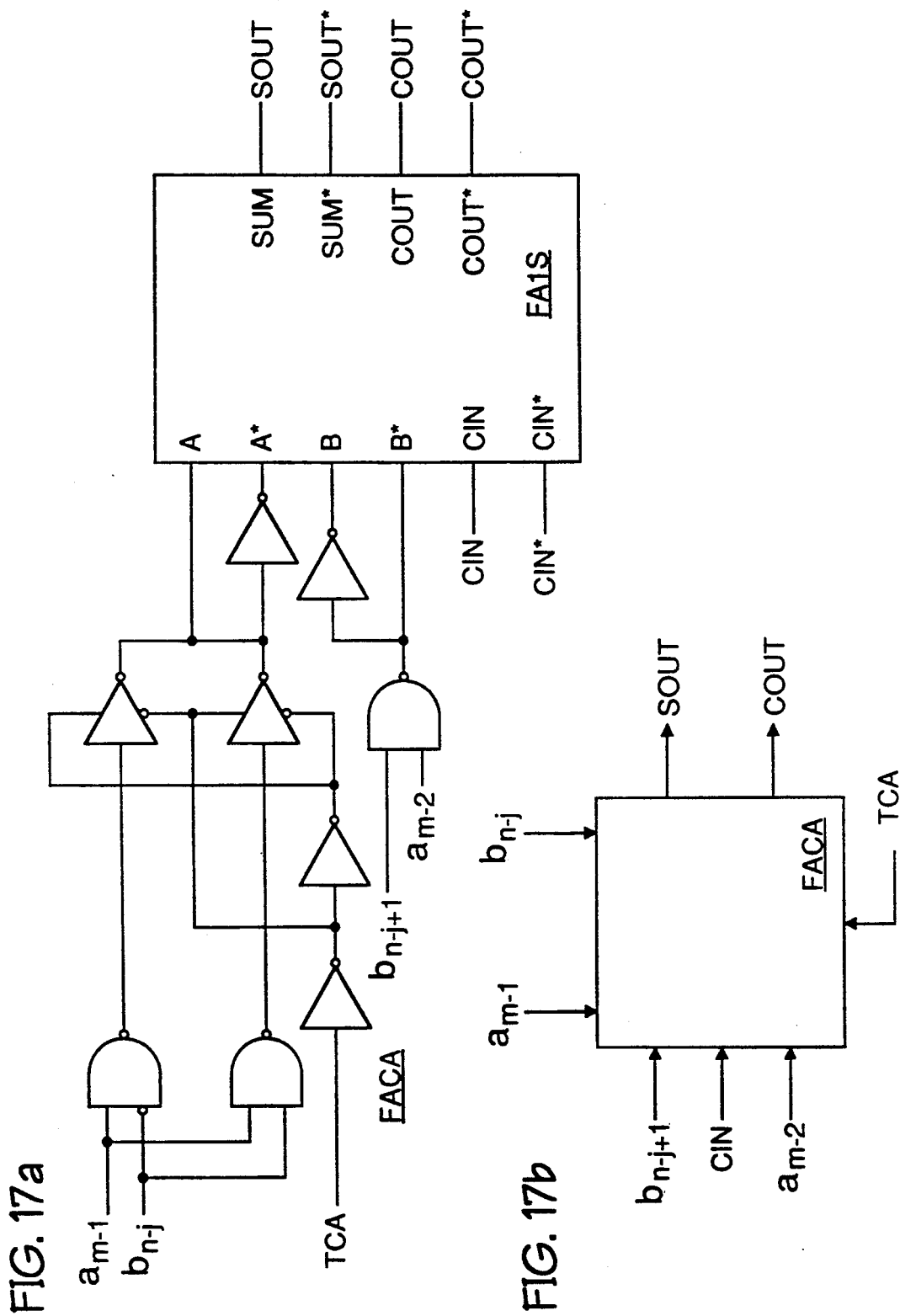
Figure 18A:
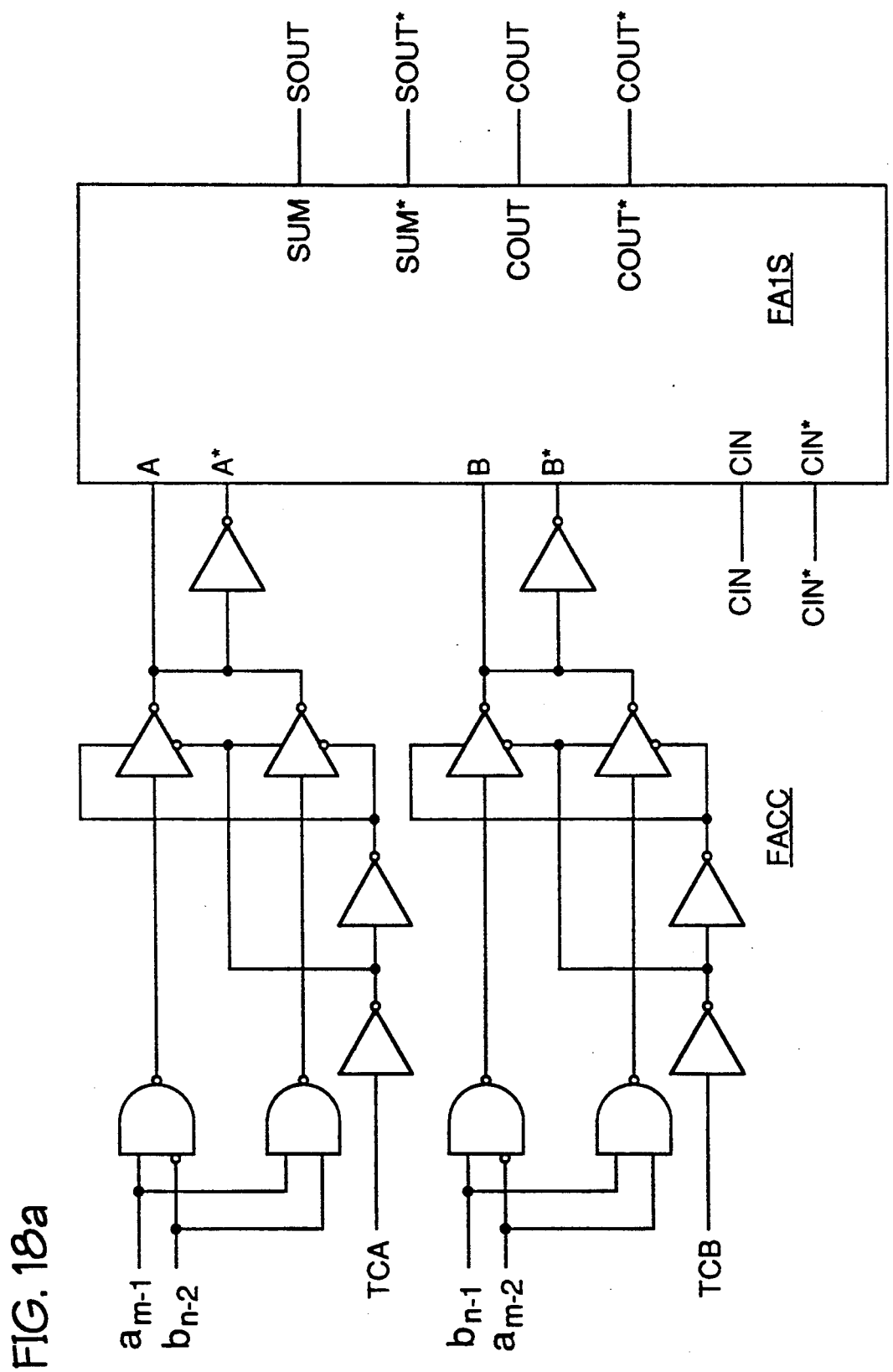
Figure 18B:
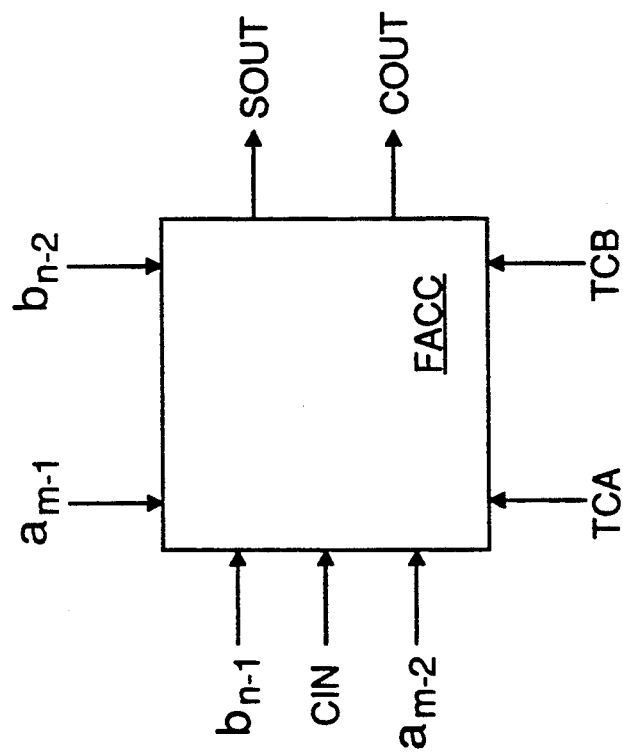
Figure 19A:
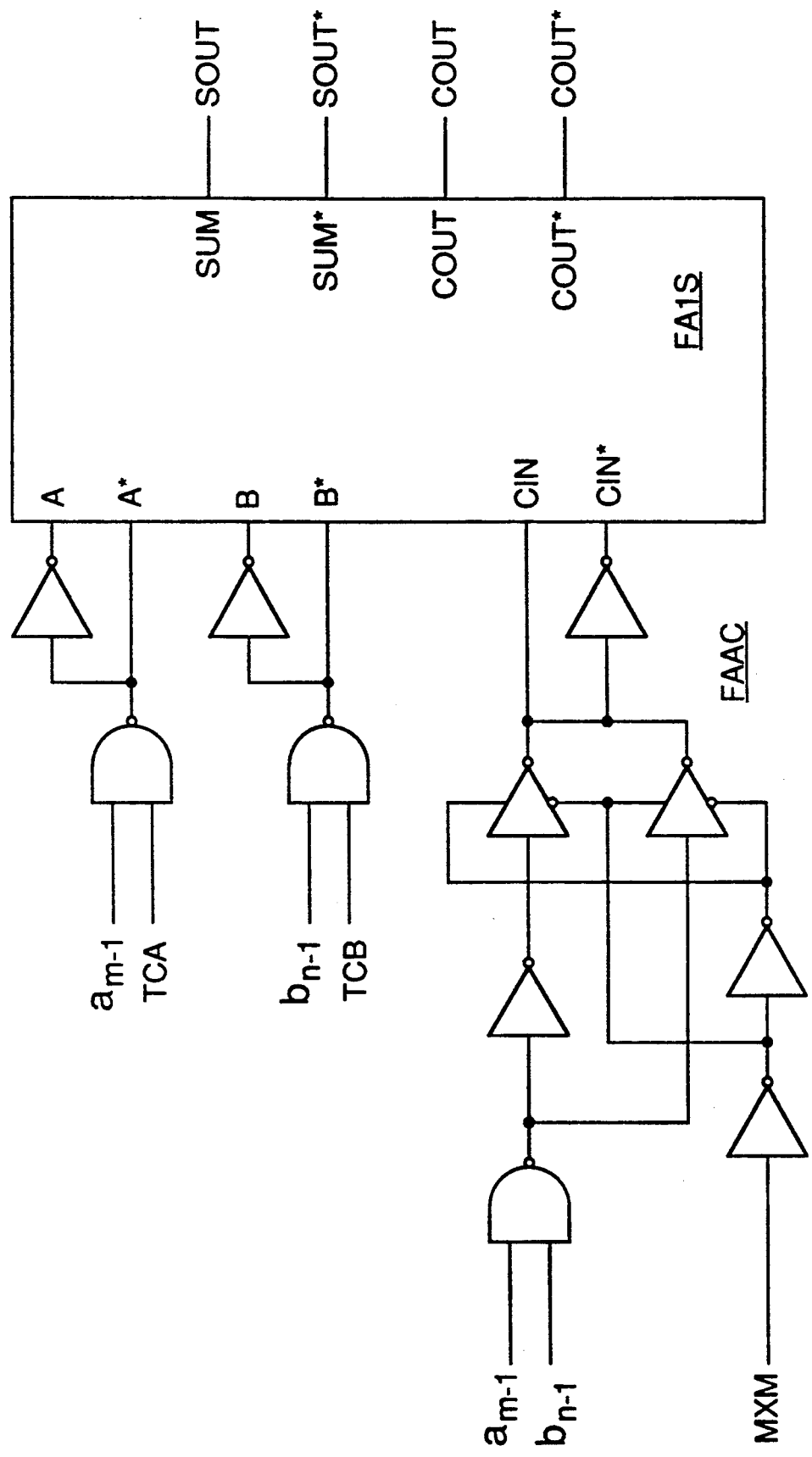
Figure 19B:
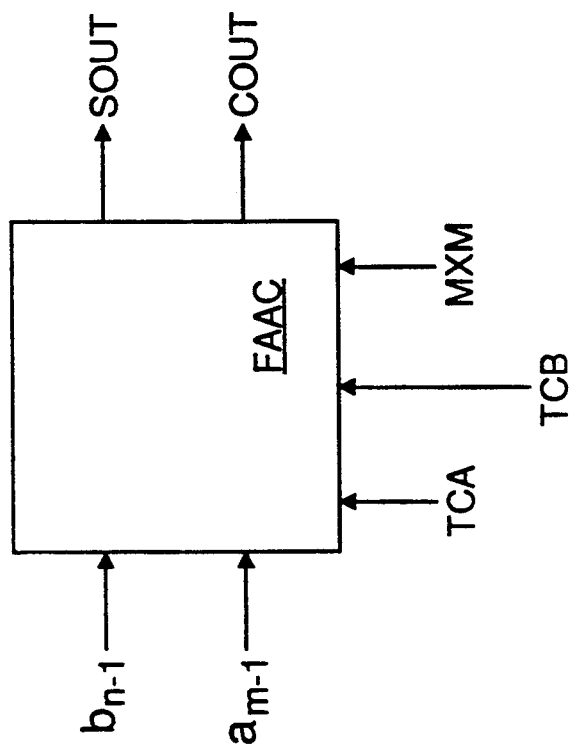
Figure 20A:
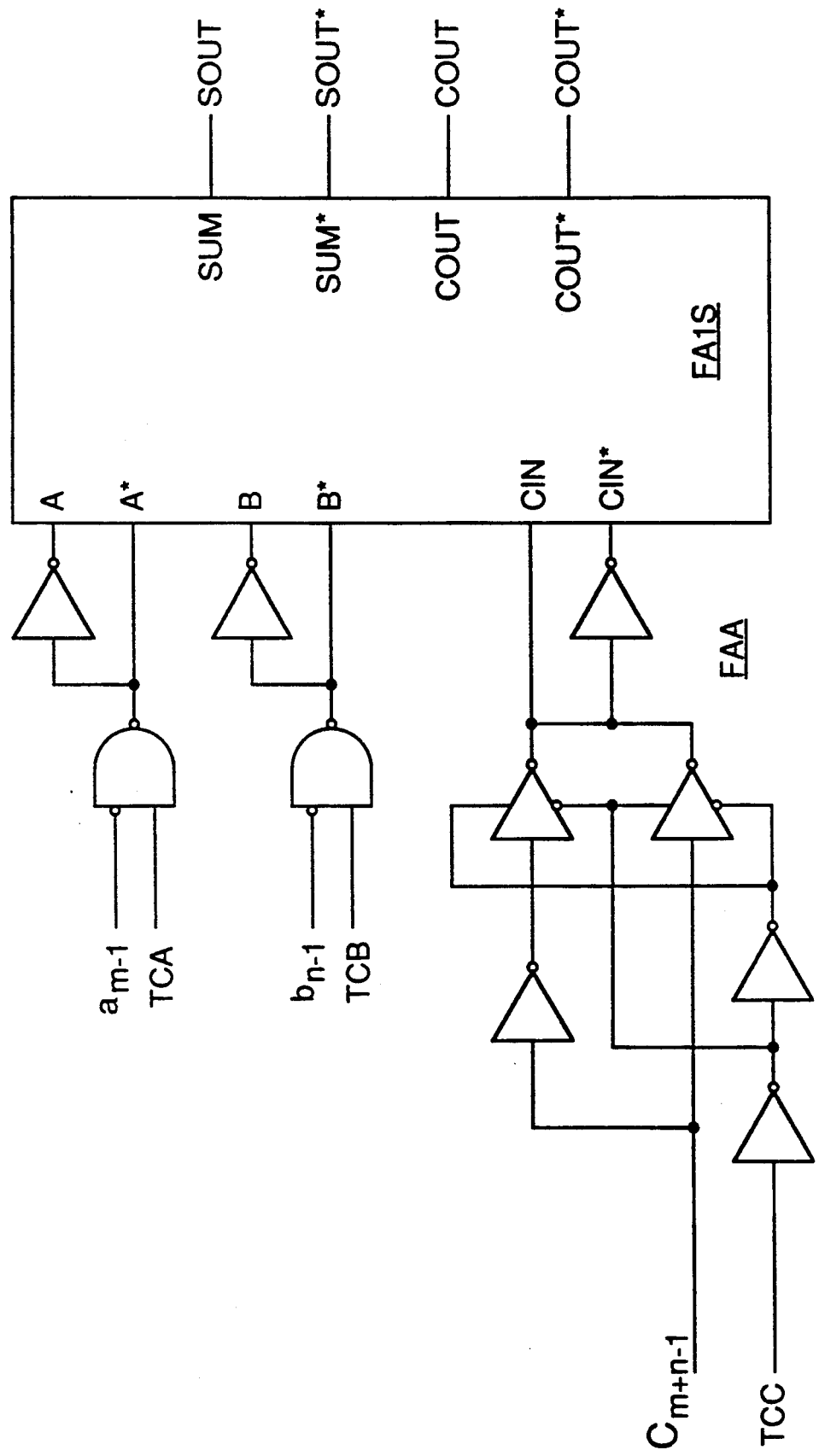
Figure 20B:
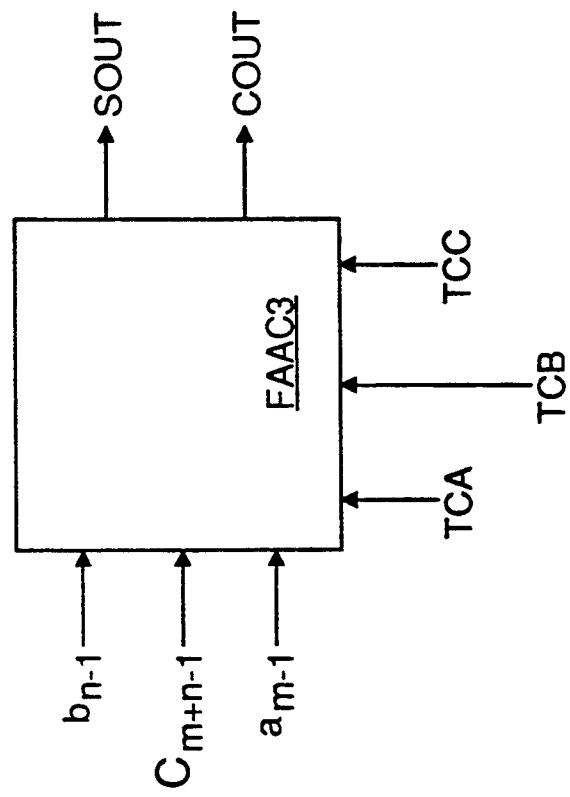
Figure 21A:
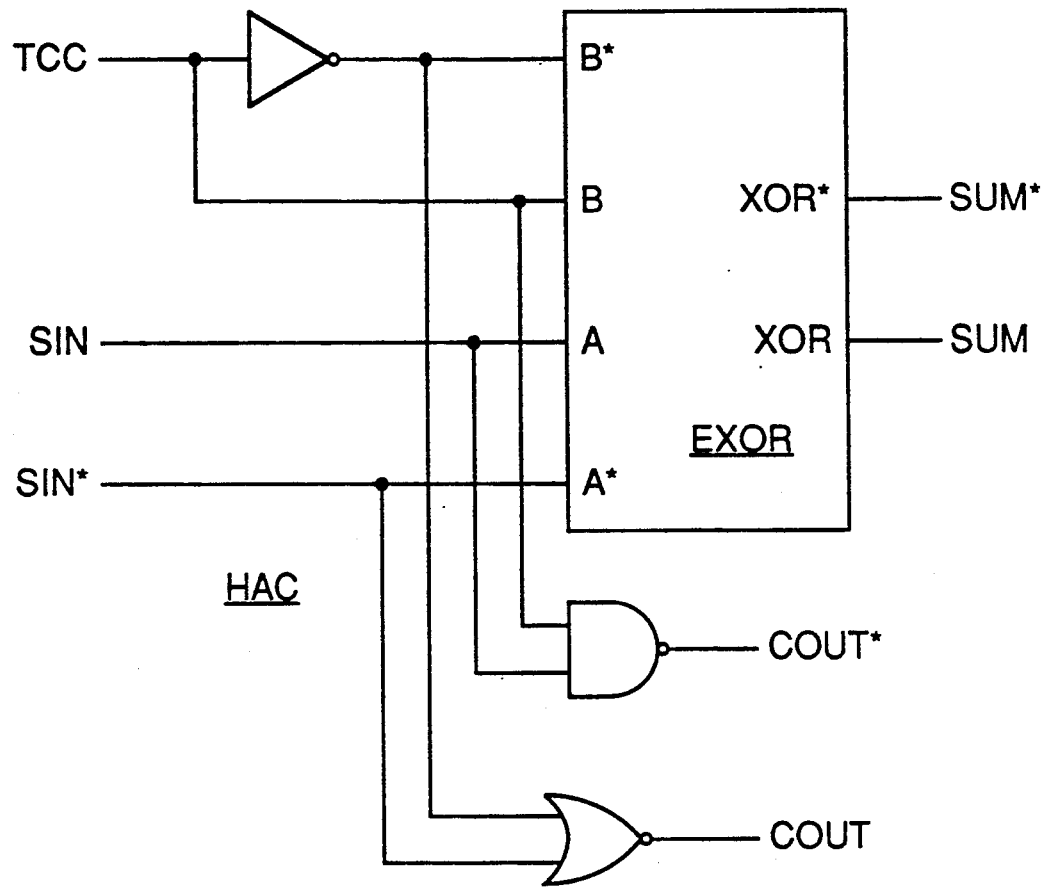
Figure 21B:
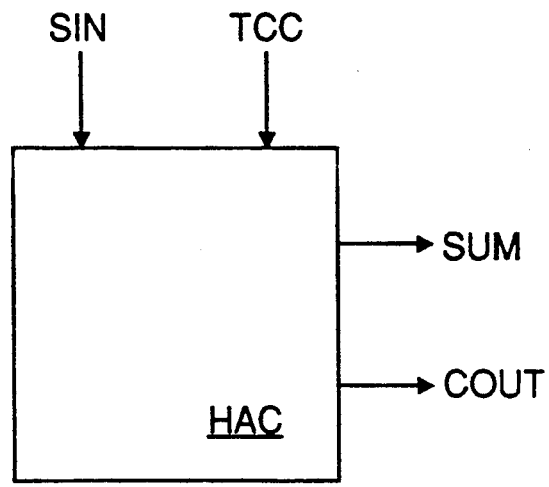
Figure 22A:
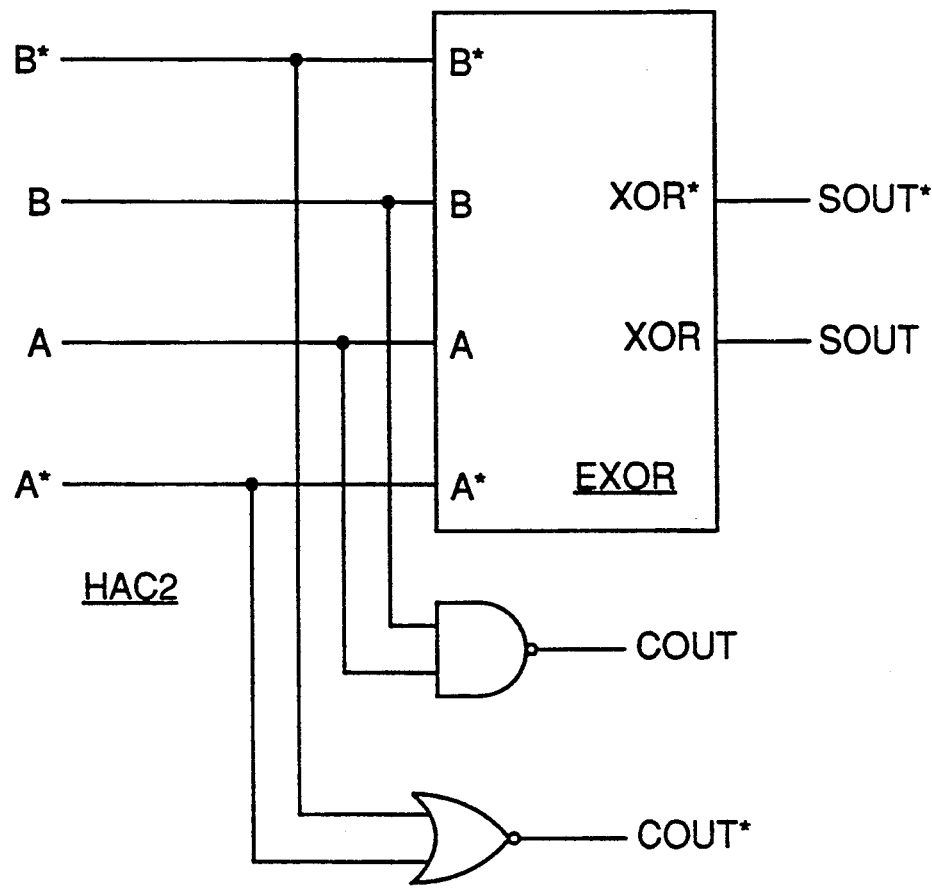
Figure 22B:
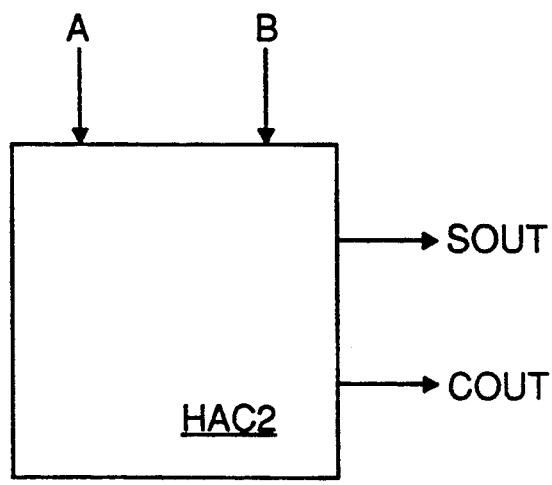

The preferred embodiment of the invention includes an n by m multiplier array having multiple-function adder elements to perform the above-derived algorithms as represented in the array configurations of FIGS. 8c, 9c, 10c, and 11c. For the sake of illustration, an 8 by 8 multiplier-accumulator according to the invention is shown in FIGS. 12a and 12b. The preferred embodiment merges the four multiplication-accumulation modes into a single arrayed set 10 of adder elements 100–107, 110–117, 120–127, 130–137, 140–147, 150–157, 160–169, 170–179, and 180–188, detailed in FIGS. 13 through 23, of which the "A" figures show a schematic, and the "B" figures show a corresponding logical symbol used in FIG. 12b. It is noted that some of the signals shown in the logical symbols are to interpreted differentially, and some nondifferentially. For example, SIN in FIG. 14b is differential (representing true SIN and complement SIN*, shown in FIG. 14a), while input $a_i$ is not.

The elements will now be described. The following chart is provided for cross-reference:

| Adder Type | Figure | Elements |
|---|---|---|
| FA1S | 13 | 110, 120, 130, 140, 150, 160, 170, 172-177, 180-187 |
| FA1A | 14 | 111-116, 121-126, 131-136, 141-146 151-156, 178 |
| FA2A | 15 | 100-106, 171 |
| FAC | 16 | 161-166 |
| FACA | 17 | 107, 117, 127, 137, 147, 157 |
| FACC | 18 | 167 |
| FAAC | 19 | 168 |
| FAAC3 | 20 | 169 |
| HAC | 21 | 179 |
| HAC2 | 22 | 188 |

Figure 23:
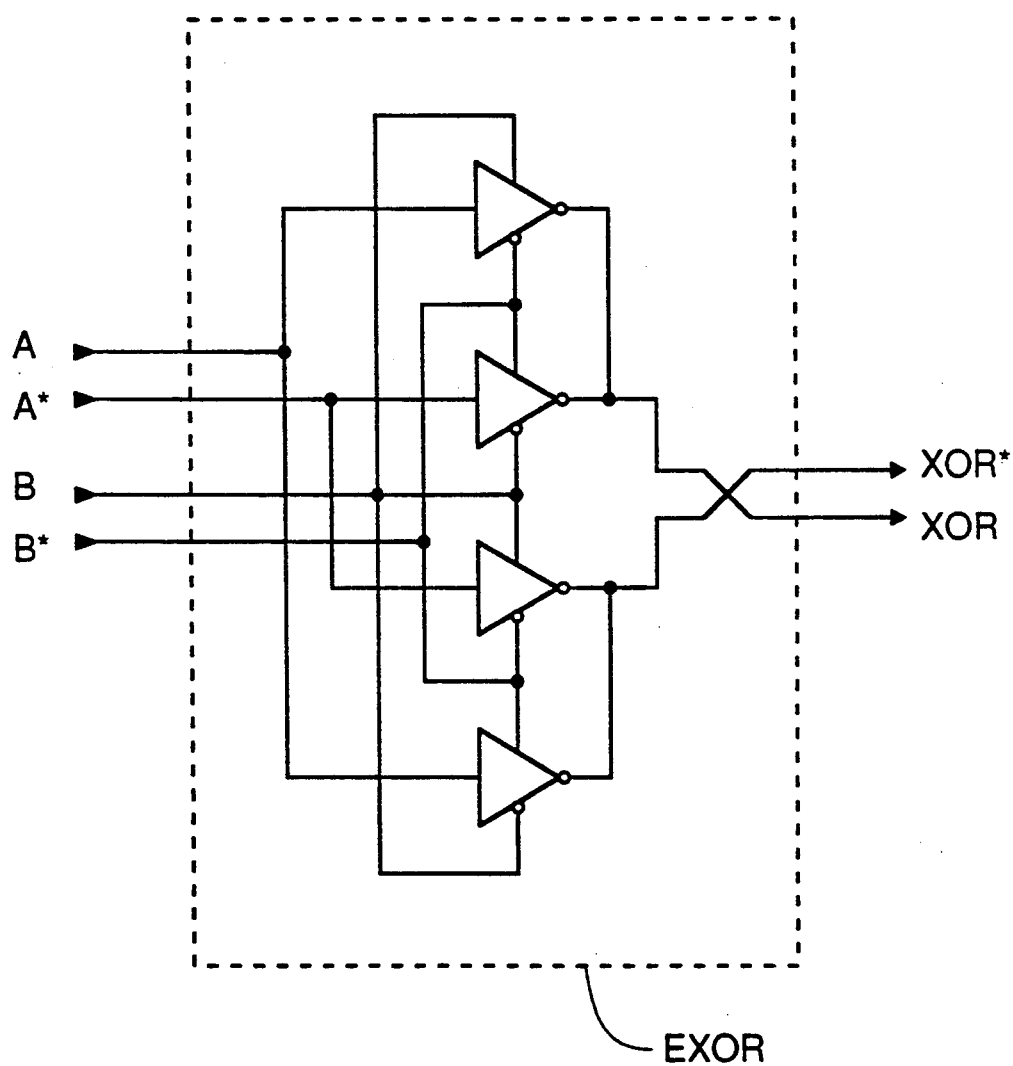
FIG. 23 details a preferred exclusive-OR gate.

FA1S (FIG. 13) is a 3-bit fully differential full-adder cell, with propagation times of 2 gate delays from sum-in to sum-out and 1 gate delay from carry-in to carry-out, when the preferred EXOR circuit of FIG. 23 is used.

FA1A (FIG. 14) performs:

$(a_i \cdot b_j) + SIN + CIN$.

FA2A (FIG. 15) performs:

$(a_{j+1} \cdot b_0) + (a_j \cdot b_1) + CIN$.

FAC (FIG. 16) performs:

$((A_{m-j} \cdot b_{n-1}$ AND TCB$)$ OR $(a_{m-j} \cdot b_{n-1}$ AND TCB$^*)) + SIN + CIN$, where TCB$^*$ is the inverse of TCB.

FACA (FIG. 17) performs:

$((a_{m-1} \cdot B_{n-j}$ AND TCA$)$ OR $(a_{m-1} \cdot b_{n-j}$ AND TCA$^*)) + a_{m-2} \cdot b_{n-j+1} + CIN$.

FACC (FIG. 18) performs:

$((a_{m-1} \cdot B_{n-2}$ AND TCA$)$ OR $(a_{m-1} \cdot b_{n-2}$ AND TCA$^*)) + ((A_{m-2} \cdot b_{n-1}$ AND TCB$)$ OR $(a_{m-2} \cdot b_{n-1}$ AND TCB$^*)) + CIN$.

FAAC (FIG. 19) performs:

$((a_{m-1} \cdot b_{n-1}$ AND MXM$)$ OR (NOT$(a_{m-1} \cdot b_{n-1})$ AND MXM$^*)) + a_{m-1} \cdot TCA + b_{n-1} \cdot TCB$.

Note here that $A \cdot B + 1$ is logically equivalent to NOT-$(A \cdot B)$.

FAAC3 (FIG. 20) performs:

$((c_{m+n-1}$ AND TCC$)$ OR $(C_{m+n-1}$ AND TCC$^*)) + A_{m-1} \cdot TCA + B_{n-1} \cdot TCB$.

HAC (FIG. 21) performs:

TCC + SIN.

HAC2 (FIG. 22) performs:

A + B.

Figure 24:
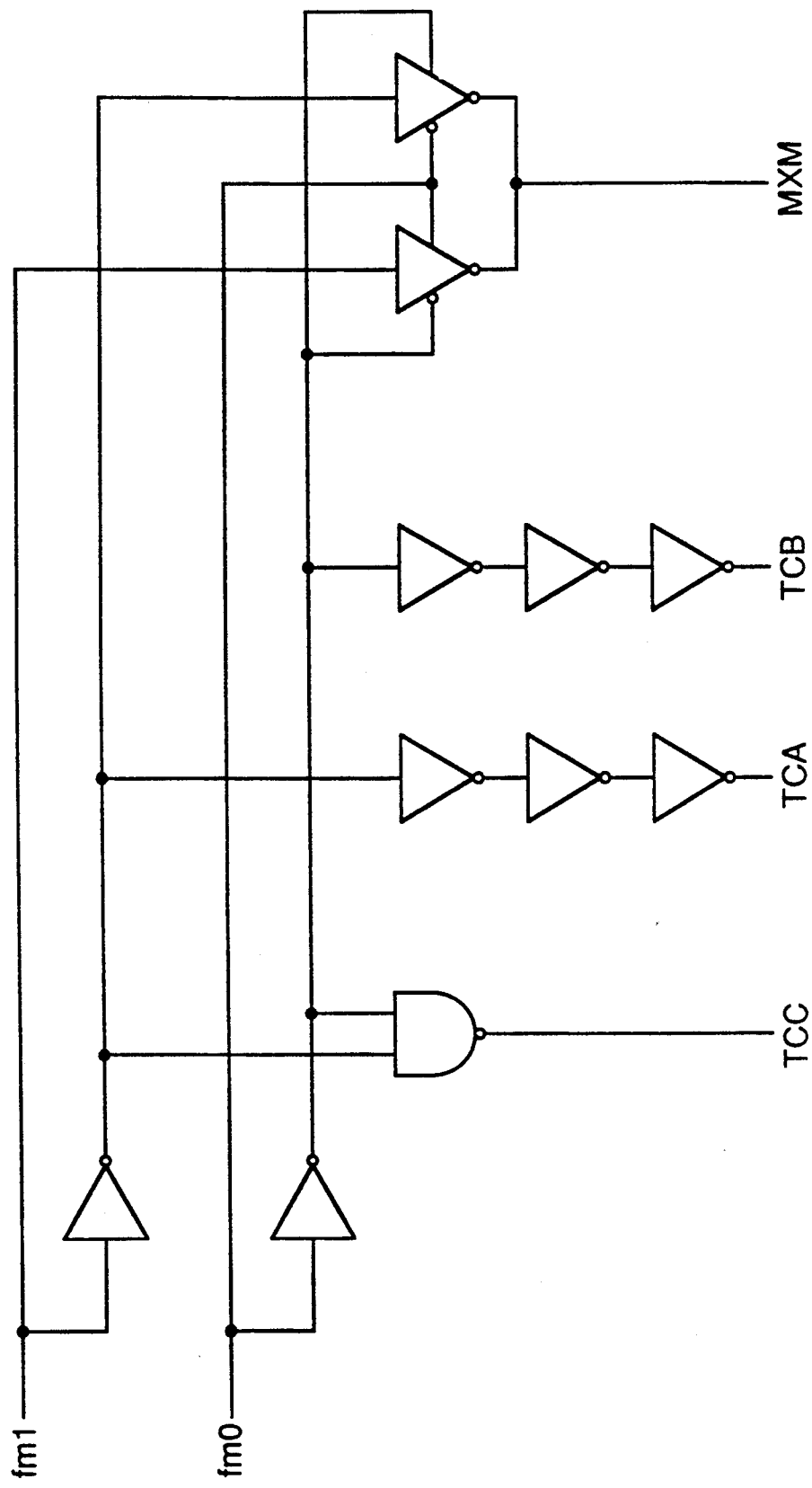
FIG. 24 details generation of control signals TCA, TCB, TCC, and MXM.

FAC, FACA, FACC, FAAC, FAAC3 are all adder elements that perform more than one type of addition, and are controlled by signals TCA, TCB, TCC, and MXM. The generation of TCA, TCB, TCC, and MXM is detailed in FIG. 24 and in the chart below.

| Mode | TCA | TCB | TCC | MXM |
|---|---|---|---|---|
| Unsigned | 0 | 0 | 0 | 0 |
| Mixed Mode B | 0 | 1 | 0 | 1 |
| Mixed Mode A | 1 | 0 | 0 | 1 |
| Two's Complement | 1 | 1 | 1 | 0 |

The above elements when connected as shown in FIG. 12 perform together as a universal multiplier-accumulator, capable of multiplying in unsigned mode, two's complement mode, and mixed modes A and B.

FIG. 12b further shows the preferred embodiment having multiple data input bits $V_{SS}$ (logical 0), $V_{DD}$ (logical 1), $a_0$-$a_7$, $b_0$-$b_7$, and carry in bits $c_0$-$c_{15}$. Output bits include carry-out bits $co_0$-$co_{15}$ and sum bits $s_0$-$s_{16}$. MXM, TCA, TCB, and TCC are control inputs, and NC denotes a no-connect. SUM-out and carry-out bits $s_0$-$s_{16}$ and $co_0$-$co_{15}$ are summed in final adder 11 of FIG. 12a.

Simplicity and interconnectivity are improved by designing similarity across all elements. For example, each full-adder shares the same basic primitive cell (FAIS) with compensation logic included as required. Some adder elements must be able to perform more than one function. It is primarily for this reason that several adder types are used in the preferred embodiment.

For example, element 168 of FIG. 12b multiply-accumulates $a_7 \cdot b_7$ in unsigned mode, $a_7 \cdot b_7 + a_7 + b_7$ in two's complement mode, $A_7 \cdot B_7 + a_7$ in mixed mode A, and $A_7 \cdot B_7 + b_7$ in mixed mode B (compare FIGS. 8c, 9c, 10c, and 11c, respectively).

The partial products within term M for all multiplication modes are performed within elements 100-106, 200-206, 300-306, 400-406, 500-506, 600-606, and 700-706. For example, the partial product $a_0 \cdot b_0$ is implemented by FA2A element 100 when connected as shown in FIG. 12b.

Term O of FIG. 8a is shown in FIG. 8b at the upper left side of M. These terms are implemented by elements 107, 117, 127, 137, 147, 157, and 167. For example, term $a_7 \cdot b_0$ in FIG. 8b is implemented by element 107 when connected as shown.

Term N of FIGS. 8a and 8b is implemented by elements 160-166. For example, term $a_0 \cdot b_7$ is implemented by element 160 when connected as shown.

These terms in other modes are similarly accomplished by the preferred embodiment.

Elements 108 and 171 are now further elucidated. Term $a_{m-1}$ is added in the column of $c_{m-1}$ in two's complement mode and mixed mode A. Term $b_{n-1}$ is added in the column of $c_{n-1}$ in two's complement mode and mixed mode B. In the preferred embodiment, m = n = 8, so a7 and/or b7 are added in the column of c7 in all but unsigned mode. The addition of term a7 is accomplished by element 108. Note that 108 outputs a differential signal. The addition of term b7 is accomplished by element 171. This arrangement allows proper addition of $a_{m-1}$ and $b_{n-1}$ even if m≠n.

Final addition of the sumout and carryout terms of the preferred array 10 is performed by final adder 11, shown in FIG. 12a, which comprises any of several possible adder configurations, including, for example, full carry lookahead, carry select, and conditional-sum type adders.

The preferred embodiment is fast when fast adders (such as the preferred) are used. Speed is further improved in the preferred embodiment in FIG. 12 by summing all even rows together, summing all odd rows together, and adding the even sum with the odd sum in final adder 11 (a Wallace tree technique). It is noted that three or more groups of rows can similarly be summed, but the apparent speed improvement thus gained is lost due to increased parasitic capacitances in the longer interconnections. A path limit of 22 mils or less is deemed desirable to limit parasitics and optimize speed. Short interconnections therefore makes Wallace tree summation of two groups of rows preferable.

Many variations may be made to the embodiment without making it a different invention. Different adder element designs may be used, as well as alternate EXOR designs. Although the preferred embodiment is integrated into a semiconductor substrate using CMOS techniques, other fabrication technologies might be used. The circuit may be constructed discretely and still embody the same invention.

I claim:

1. A multiplier-accumulator array, having adders comprising:
   a sum generator, comprising:
      first and second XOR circuits;
      first and second inputs of said first XOR circuit being differentially responsive to first and second bits, respectively, and first and second inputs of said second XOR circuit being differentially responsive to an output of said first XOR circuits, and a third bit, respectively;
      wherein an output of said second XOR circuit provides a differential output for the sum generator, said differential output being in a first state when an odd subset of said first, second, and third bits are true, and being in a second state when an even subset of said first, second, and third bits are true;
      wherein at least one of said first and second XOR circuits comprises: first, second, third, and fourth tristate devices;
      said tristate devices having inputs w, x, y, and z, respectively, which correspond to the inputs of the XOR circuit;
      an output of each of said first and second tristate devices being coupled to form a first XOR circuit output;
      an output of each of said third and fourth tristate devices being coupled to form a second XOR circuit output; and
      said first and third tristate devices being tristated when an enable input is in a first state, and said second and fourth tristate device being tristated when said enable input is in a second state;
      wherein said inputs w and z are responsive together and said inputs x and y are responsive together, said inputs w and z are differentially responsive to a bit A, said enable input is differentially responsive to a bit B, and said first and second logic circuit outputs are able to differentially provide an XOR function of said bits A and B;
   a carry-out generator, comprising:
      a first input, responsive to said output of said first XOR circuit;
      a second input, differentially responsive to one of said first and second bits;
      a third input, differentially responsive to said third bit; and
      a logic circuit, which provides a first differential state when at least two of said first, second, and third bits are true, and otherwise provides a second state;
   wherein said sum generator and said carry-out generator provide a sum bit and a carry-out bit, respectively, on said first, second, and third bits;
   wherein said logic circuit comprises:
      first, second, third, and fourth tristate devices;
      said tristate devices having inputs w, x, y, and z, respectively, which correspond to the inputs of the logic circuit;
      an output of each of said first and second tristate devices being coupled to form a first logic circuit output;
      an output of each of said third and fourth tristate devices being connected together to form a second logic circuit output; and
      said first and third tristate devices being tristated when an enable input is in a first state, and said second and fourth tristate devices being tristated when said enable input is in a second state;
      wherein said enable input is said first input, said inputs x and z form said second input, and said inputs w and y form said third input;
   wherein said sum generator and said carry-out generator provide a sum bit and a carry-out bit, respectively, on said first, second, and third bits.

2. The multiplier-accumulator array of claim 1, wherein said adders are arranged in a Wallace tree.

3. An apparatus for use in a digital processing system for producing a product P from operands X and Y, either of which may be represented in either two's complement format or unsigned format, and accumulate it with a term Z, wherein X is representable as vector $(a_{m-1}, a_{m-2}, \ldots, a_0)$ and Y as vector $(b_{n-1}, b_{n-2}, \ldots, b_0)$, said apparatus constructed from an array of substantially identical 3-bit adders, said 3-bit adders comprising a sum generator and a carry-out generator;
   said sum generator, including first and second XOR circuits;
      said first XOR circuit having first and second inputs which are differentially responsive to first and second bits, respectively;
      said second XOR circuit having first and second inputs which are differentially responsive to an output of said first XOR circuit, and a third bit, respectively;
      said second XOR circuit providing a differential output for the sum generator, said differential output being in a first state when an odd subset of said first, second, and third bits are true, and being in a second state when an even subset of said first, second, and third bits are true;
      at least one of said first and second XOR circuits including first, second, third and fourth tristate devices;
      said tristate devices having inputs w, x, y, and z, respectively, which correspond to the inputs of the XOR circuit said inputs w and z being differentially responsive to a bit A, and said inputs x and y being responsive together, said inputs w and x being differentially responsive to a bit A;
      an output of each of said first and second tristate devices being coupled to form a first XOR circuit output;

an output of each of said third and fourth tristate devices being coupled to form a second XOR circuit output;

said first and third tristate devices being tristated when an enable input is in a first state, and said second and fourth tristate device being tristated when said enable input is in a second state, said enable input being differentially responsive to a bit B; and said first and second XOR circuit outputs being a differential XOR function of bits A and B;

said carry-out generator including:

a first input, responsive to said output of said first XOR circuit;

a second input, differentially responsive to one of said first and second bits;

a third input, differentially responsive to said third bit; and a logic circuit, which provides a first differential state when at least two of said first, second, and third bits are true, and otherwise provides a second state; and wherein said sum generator and said carry-out generator provide a sum bit and a carry-out bit, respectively, on said first, second, and third bits.

4. The apparatus of claim 3, wherein said logic circuit comprises:

first, second, third, and fourth tristate devices;

said tristate devices having inputs w, x, y, and z, respectively, which correspond to the inputs of the logic circuit;

an output of each of said first and second tristate devices being coupled to form a first logic circuit output;

an output of each of said third and fourth tristate devices being connected together to form a second logic circuit output;

said first and third tristate devices being tristated when an enable input is in a first state, and said second and fourth tristate devices being tristated when said enable input is in a second state; and said enable input being said first input, said inputs x and z together being said second input, and said inputs w and y together being said third input.

5. The apparatus of claim 3, wherein said 3-bit adders are arranged in a Wallace tree.

* * * * *